United States Patent [19]

Kassai

[11] Patent Number: 4,779,879
[45] Date of Patent: Oct. 25, 1988

[54] BABY CARRIAGE

[75] Inventor: Kenzou Kassai, Osaka, Japan

[73] Assignee: Aprica Kassai Kabushikikaisha, Osaka, Japan

[21] Appl. No.: 90,567

[22] Filed: Aug. 28, 1987

[30] Foreign Application Priority Data

Sep. 2, 1986 [JP] Japan ................................ 61-207402
May 28, 1987 [JP] Japan ................................ 62-132246

[51] Int. Cl.[4] ............................................ B60B 33/02
[52] U.S. Cl. ................................ 280/47.36; 16/35 R; 280/643; 280/658; 280/47.39
[58] Field of Search ......... 280/47.36, 47.39, 47.37 R, 280/642, 643, 644, 648 C, 658; 16/35 R, 35 D

[56] References Cited

U.S. PATENT DOCUMENTS

| 2,154,525 | 4/1939 | Noros et al. | 16/35 R |
| 4,608,729 | 9/1986 | Huang | 16/35 R |
| 4,684,148 | 8/1987 | Glaser | 16/35 R |
| 4,733,882 | 3/1988 | Kassai | 280/47.37 R |

Primary Examiner—David M. Mitchell
Attorney, Agent, or Firm—W. G. Fasse; D. H. Kane, Jr.

[57] ABSTRACT

A baby carriage (1) has a push rod (10) which can be switched between two states, one for the face-to-back push mode and the other for the face-to-face push mode, front wheel casters (14), and rear wheel casters (15). When the push rod (10) is in the face-to-back push mode, wire position switching means (19) is operated to maintain a wire (18) in a rear position. In this state, the engagement between front wheel caster locking means (16) and the rotary yokes of the front wheel casters (14) has been canceled, so that the front wheel casters (14) are allowed to swivel. On the other hand, rear wheel caster locking means (17) is in engagement with the rotary yokes of the rear wheel casters (15), so that the swiveling of the rear wheel casters is inhibited. When the push rod (10) is switched to the face-to-face push mode, the wire position switching means is operated to switch the wire to the front position. In this state, the front wheel caster locking means (16) is in engagement with the rotary yokes of the front wheel casters (14), so that the swiveling of the front wheel casters (14) is inhibited. On the other hand, the engagement between the rear wheel caster locking means (17) and the rotary yokes of the rear wheel casters (15) is canceled, so that the swiveling of the rear wheel casters (15) is allowed.

12 Claims, 21 Drawing Sheets

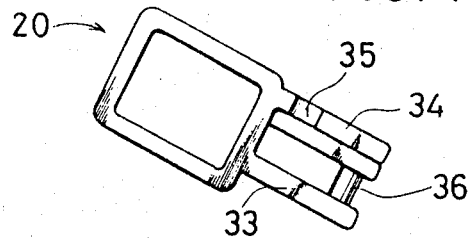
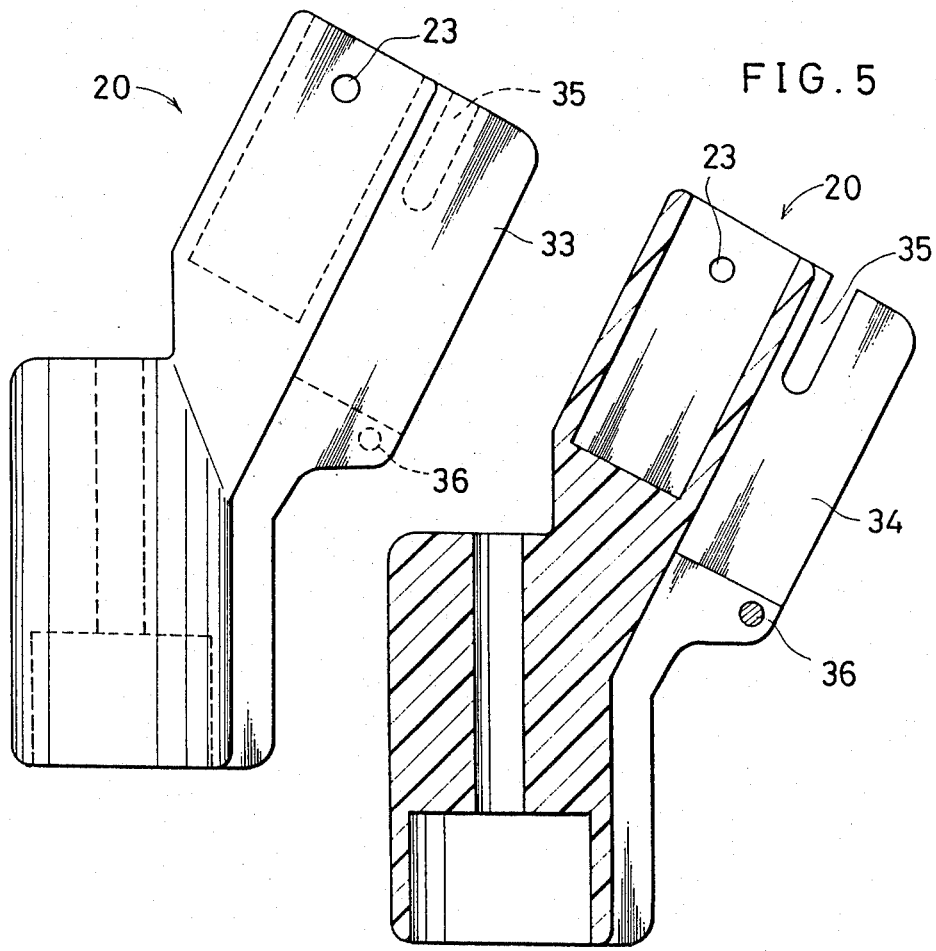

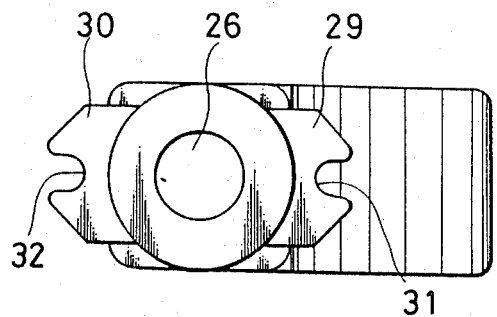
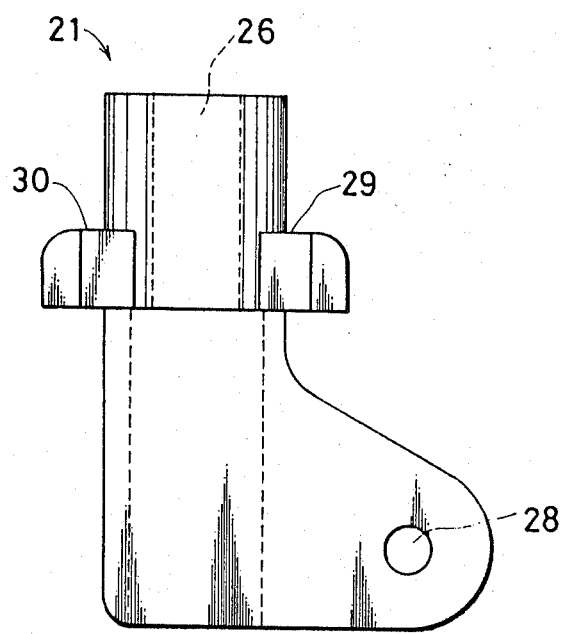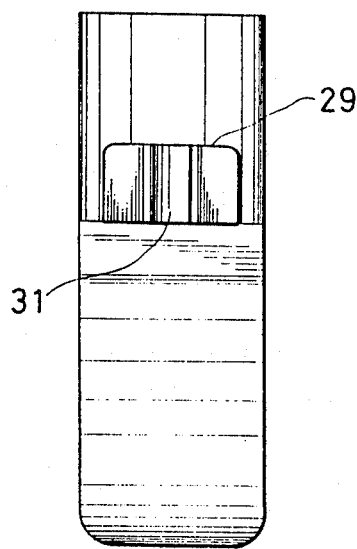

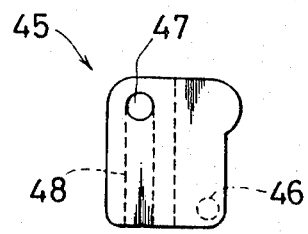
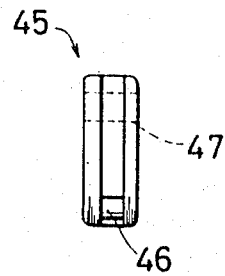
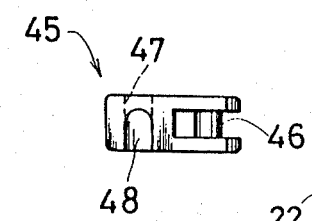
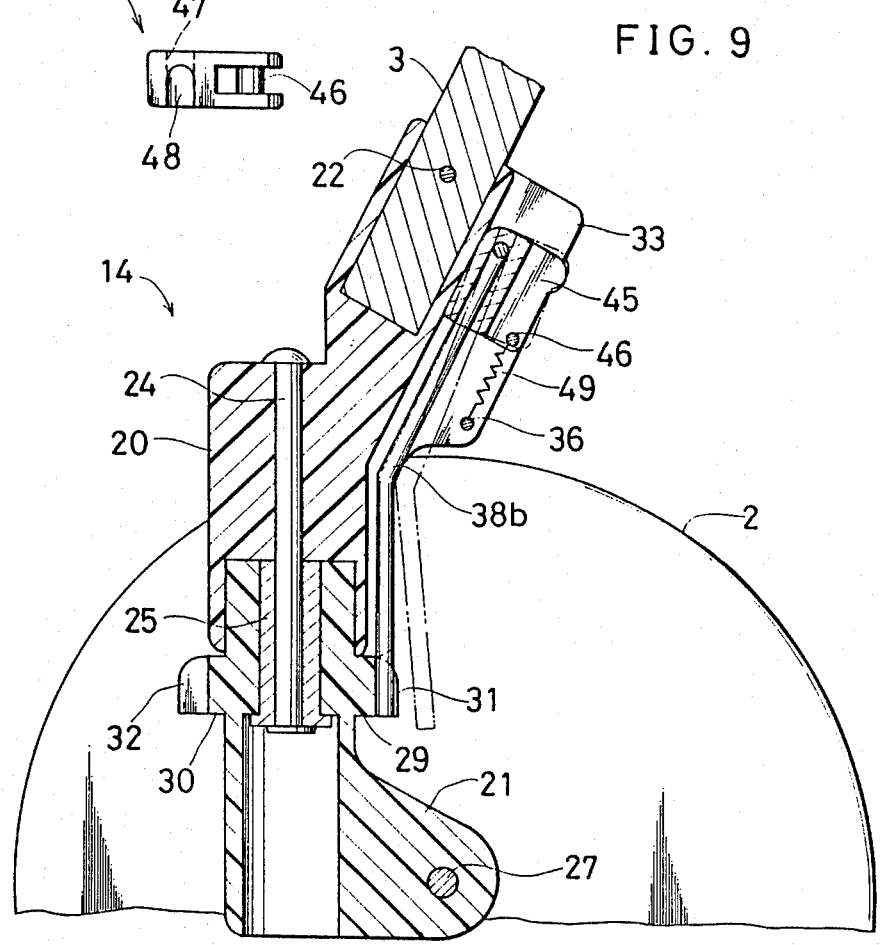

FIG. 13
FIG. 14
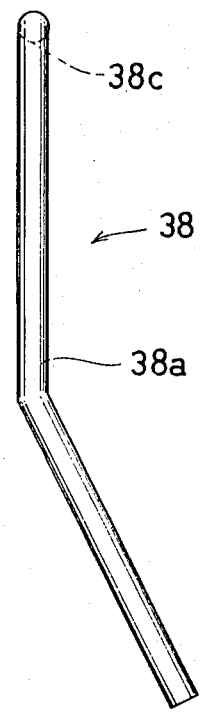
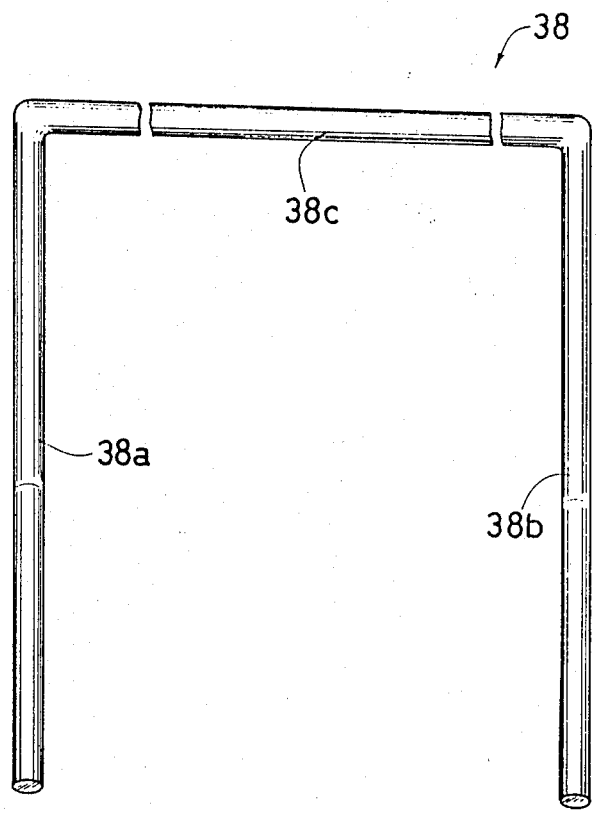

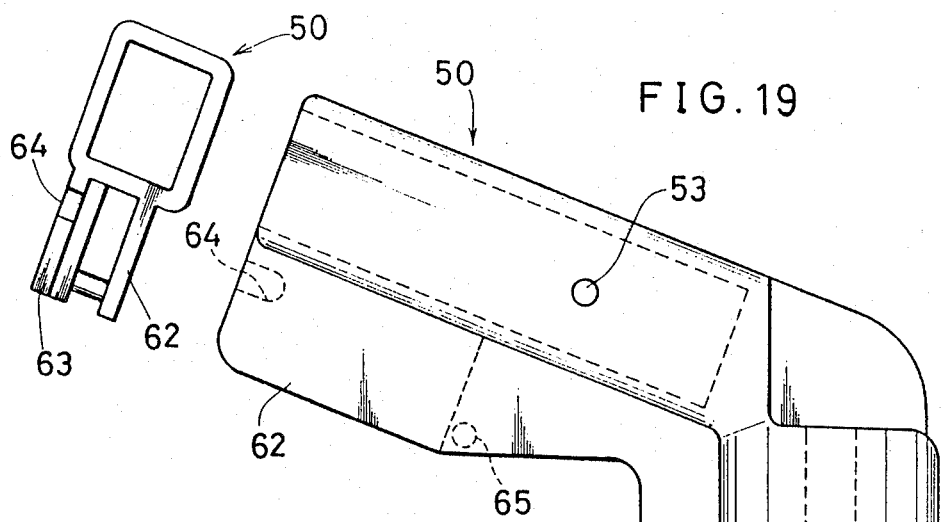
FIG. 20
FIG. 19
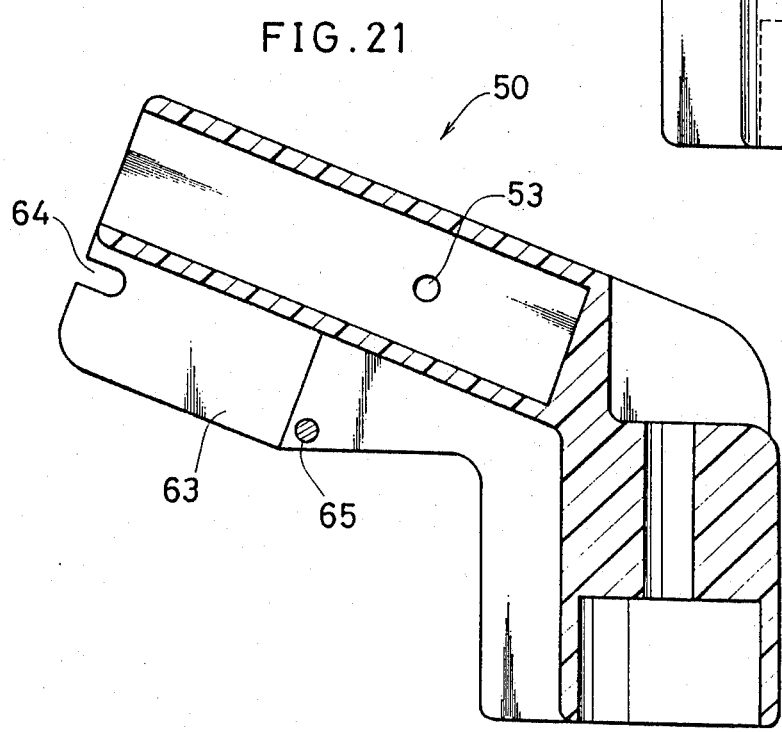
FIG. 21

FIG. 23
FIG. 22
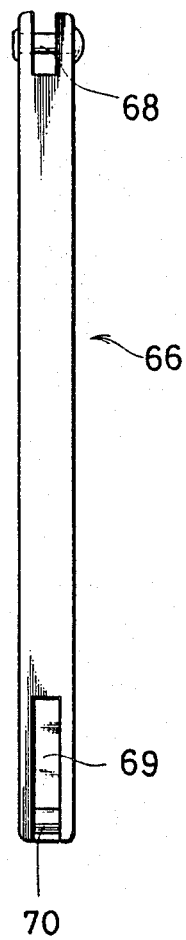
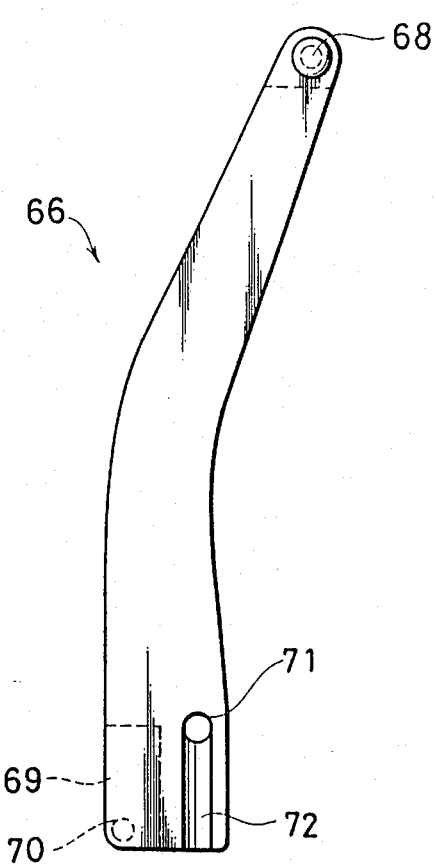
FIG. 24
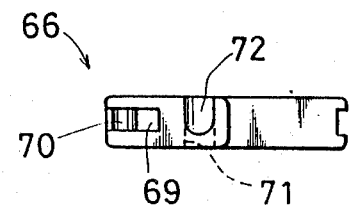

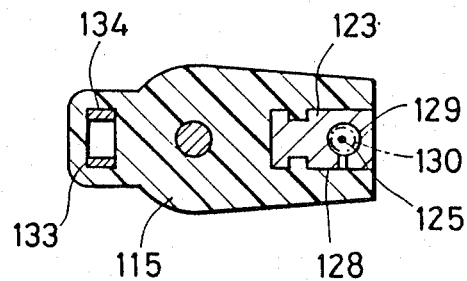
FIG. 37
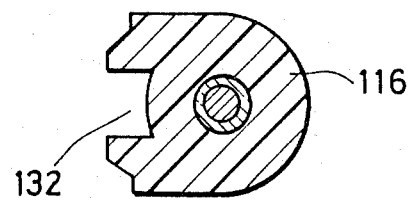
FIG. 38
FIG. 40
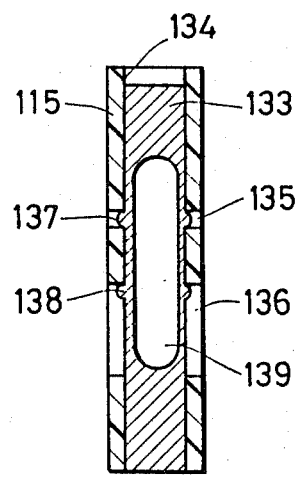
FIG. 39
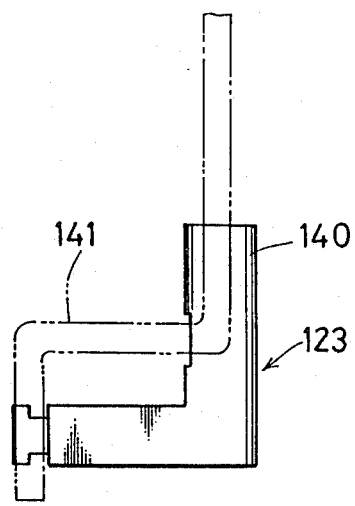

BABY CARRIAGE

BACKGROUND OF THE INVENTION

1. Field of the Invention

This invention relates to a baby carriage, particularly to a baby carriage having a push rod switchable between two states, one for the face-to-back push mode and the other for the face-to-face push mode, with front wheel casters attached to the lower ends of a pair of front legs and rear wheel casters attached to the lower ends of a pair of rear legs.

2. Description of the Prior Art

There are a variety of baby carriages on the market, including one having front wheel casters which make the front wheels swivelable. This type of baby carriage can easily change its direction of travel and is superior in operability.

Further, there is also a baby carriage on the market having a push rod switchable between two states, one for the face-to-back push mode and the other for the face-to-face push mode. According to this type, the baby carriage can be pushed not only from the side associated with the baby's back but also in face-to-face relation in which the pusher looks at the baby's face while talking to him.

A baby carriage having said two functions, i.e., a baby carriage provided both with said front wheel casters and with said two-state switchable push rod is also on the market.

When said baby carriage having said two functions is moved with the push rod in the face-to-back push mode, the front casters effectively act, ensuring a smooth change of direction. However, when the baby carriage is moved with the push rod switched to the face-to-face push mode, the rear wheels, which are now positioned forward with respect to the direction of travel, are not swivelable, so that a smooth change of direction cannot be attained. In this case, if the front wheel casters, now positioned rearward with respect to the direction of travel, freely swivel, this degrades operability to the contrary of expectation. Thus, it is common practice to lock the front casters to inhibit their swiveling when the push rod is switched to the face-to-face push mode.

SUMMARY OF THE INVENTION

Accordingly, an object of the invention is to provide a baby carriage having a push rod switchable between two state, one for the face-to-back push mode and the other for the face-to-face push mode, wherein change of direction can be easily effected irrespective of whether said push rod is one or the other of said two states. More specifically, the invention provides a baby carriage having a pair of front wheel casters and a pair of rear wheel casters, said baby carriage being adapted to selectively lock either said front wheel casters or said rear wheel casters.

The invention is directed to a baby carriage including a push rod switchable between two states, one for the face-to-back push mode and the other for the face-to-face push mode, and front wheel casters on the lower ends of a pair of front legs and rear wheel casters on the lower ends of a pair of rear legs. The pair of front wheel casters and the pair of rear wheel casters respectively have fixed brackets attached to the front and rear legs, and rotary yokes rotatably supported by said fixed brackets and rotatably supporting wheels.

Said baby carriage includes the following:

a. Front wheel caster locking means movable between first and second positions and adapted, when in said first position, to engage the rotary yoke of the front wheel caster to inhibit the rotation of said rotary yoke;

b. Rear wheel caster locking means movable between first and second positions and adapted, when in said first position, to engage the rotary yoke of the rear wheel caster to inhibit the rotation of said rotary yoke;

c. A front wheel return spring urging the front wheel caster locking means to return to the first position;

d. A rear wheel return spring urging the rear wheel caster locking means to return to the first position;

e. A wire connected at one end thereof to the front wheel caster locking means and at the other end to the rear wheel caster locking means;

f. Wire position switching means for switching the position of said wire between a front position in which it is relatively close to the front wheel caster and a rear position in which it is relatively close to the rear wheel caster.

When said wire is in the front position, the front wheel caster locking means is in the first position and engages the rotary yoke of the front wheel caster and, on the other hand, the rear wheel caster locking means is in the second position and allows the rotation of the rotary yoke of the rear wheel caster.

When said wire is in the rear position, the front wheel caster locking means is in the second position and allows the rotation of the rotary yoke of the front wheel caster and, on the other hand, the rear wheel caster locking means is in the first position and engages the rotary yoke of the rear wheel caster.

When the push rod is in the face-to-back push mode, the wire position switching means is operated to maintain the wire in the rear position. In that state, since the engagement between the front wheel caster locking means and the rotary yoke of the front wheel caster has been canceled, the swiveling of the front wheel caster is allowed. On the other hand, since the rear wheel caster locking means is engaged with the rotary yoke of the rear wheel caster, the swiveling of the rear wheel caster is inhibited. Since, in this manner, only the front wheel caster, which is positioned forward with respect to the direction of travel, is allowed to swivel, it is possible to effect smooth change of direction.

Next, when the push rod is changed to the face-to-face push mode, the wire position switching means is operated to switch the wire to the front position. In this state, since the front wheel caster locking means is engaged with the rotary yoke of the front wheel caster, the swiveling of the front wheel caster is inhibited. On the other hand, since the engagement between the rear wheel caster locking means and the rotary yoke of the rear wheel caster is canceled, the swiveling of the rear wheel caster is allowed. Since, in this manner, only the rear wheel caster, which is positioned forward with respect to the direction of travel, is allowed to swivel, it is possible to effect a smooth change of direction.

Further, in a certain embodiment of the invention, the wire position switching means is adapted to be switched by a turning operation on the push rod. More particularly, when the push rod is in the face-to-back push mode, the wire position switching means brings the wire to the rear position where it is relatively close to the rear wheel casters, whereby the front wheel casters alone which are positioned forward with respect to the direction of travel of the baby carriage are allowed to swivel. If the push rod is switched to the face-to-face push mode, the wire position switching means brings the wire to the front position where it is relatively close to the front wheel casters. In that case, the rear wheel casters alone which are positioned rearward with respect to the direction of travel are allowed to swivel. In this embodiment, only those casters which are positioned forward with respect to the direction of travel of the baby carriage are allowed to swivel simply by operating the push rod for turning movement rther than by directly operating the wire position switching means by hand.

As described above, according to the invention, whether the push rod is in the face-to-back push mode or the face-to-face push mode, it is possible to allow the swiveling of only the casters which are positioned forward with respect to the direction of travel by a simple operation. Thus, in both the face-to-back and face-to-face push modes a, smooth change of direction can be effected.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a side view of a fixed bracket which is a component of the front wheel caster;

FIG. 4 is a view taken from the top side of the fixed bracket shown in FIG. 3;

FIG. 5 is a sectional view of the fixed bracket shown in FIG. 3;

FIG. 6 is a side view of a rotary yoke which is a component of the front wheel caster;

FIG. 7 is a view taken from the top side of the rotary yoke shown in FIG. 6;

FIG. 8 is a view taken from the right-hand side of the rotary yoke shown in FIG. 6;

FIG. 9 is a side view, in section, of a portion associated with the front wheel caster disposed on the right-hand side of a baby carriage;

FIG. 13 is a side view of a front stopper rod 38 shown in FIG. 2;

FIG. 14 is a view taken from the right-hand side of the front stopper rod shown in FIG. 13;

FIG. 15 is a side view of a rotary plate 45 shown in FIG. 9;

FIG. 16 is a view taken from the right-hand side of the rotary plate shown in FIG. 15;

FIG. 17 is a view taken from the bottom side of the rotary plate shown in FIG. 15;

FIG. 19 is a side view showing a fixed bracket which is a component of the rear wheel caster;

FIG. 20 is a view taken from the top side of a fixed bracket shown in FIG. 19;

FIG. 21 is a sectional view of the fixed bracket of FIG. 19;

FIG. 22 is a side view of a rear rotary arm shown in FIG. 18;

FIG. 23 is a view taken from the left-hand side of the rear rotary arm shown in FIG. 22;

FIG. 24 is a view taken from the bottom side of the rear rotary arm shown in FIG. 22;

FIG. 37 is an end view taken along the line XXXVII—XXXVII in FIG. 35;

FIG. 38 is an end view taken along the line XXXVIII—XXXVIII in FIG. 35;

FIG. 39 is a plan view of a front slider 123 shown in FIG. 35;

FIG. 40 is an end view taken along the line XXXX—XXXX in FIG. 35;

DESCRIPTION OF THE PREFERRED EMBODIMENTS

Figure 46:
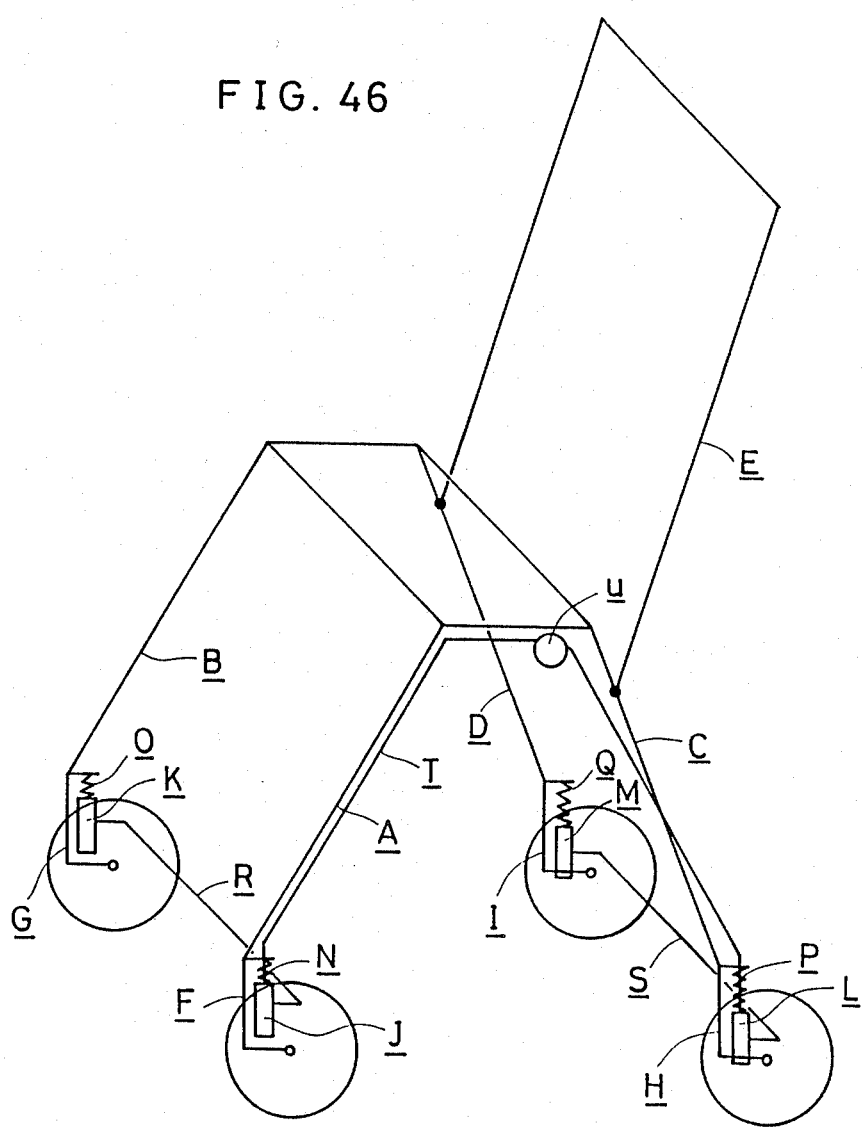
FIG. 46 is a diagrammatic view showing the outline of a baby carriage according to this invention.

First, before going into a detailed description of the embodiments, the outline of the invention will now be described using a diagrammatic view shown in FIG. 46.

The illustrated baby carriage comprises a pair of front legs A and B, a pair of rear legs C and D, and a push rod E. The push rod E is switchable between two states, i.e., the face-to-back push mode and the face-to-face push mode. In the illustrated state, the push rod E is in the face-to-back push mode.

The pair of front legs A and B has front wheel casters F and G attached to their lower ends, while the pair of rear legs C and D have rear wheel casters H and I attached to their lower ends. Associated with the pair of front wheel casters F and G, a pair of front wheel caster locking members J and K are provided. In the illustrated state, the front wheel caster locking members J and K allow the swiveling of the front wheel casters F and G. If the front wheel caster locking members J and K are moved downward from the illustrated state, they inhibit the swiveling of the front wheel casters F and G. Further, as shown, the pair of front wheel caster locking members J and K are interconnected by a connecting rod R. Therefore, if one front wheel caster locking member J is moved, the other front wheel caster locking member K is also moved.

Similarly, associated with the pair of rear wheel casters H and I, a pair of rear wheel caster locking members L and M are provided. In the illustrated state, the rear wheel caster locking member L and M inhibit the swiveling of the rear wheel casters H and I. If the rear wheel caster locking members L and M are moved upward from the illustrated state, they allow the swiveling of the rear wheel casters H and M. A connecting rod S interconnects the pair of rear wheel caster locking members L and M to operatively associate them with each other.

Front wheel-associated return springs N and O urge the front wheel caster locking members J and K to move downward. Rear wheel-associated return springs P and Q urge the rear wheel caster locking member L and M to move downward.

The front and rear wheel caster locking members J and L located on one lateral side of the baby carriage are interconnected by a wire T. Wire position switching means U is placed somewhere between the ends of the wire T. The wire position switching means U is adapted to be switched between two states, i.e., a front position where it moves the wire T relatively close to the front wheel casters F and G, and a rear position where it moves the wire relatively close to the rear wheel casters H and J. In the illustrated state, the wire T is in the rear position where it is close to the rear wheel casters H and J, and in this state only the front wheel casters F and G are allowed to swivel.

The push rod E is switched from the illustrated state to the face-to-back push mode and the wire position switching means U is operated for switching. Thereupon, the wire T is brought to the front position where it is close to the front wheel casters F and G. As a result, the front wheel caster locking members J and K inhibit the swiveling of the front wheel casters F and G, while the rear wheel caster locking members L and M allow the swiveling of the rear wheel casters H and I. Thus, in the face-to-face push mode, only the rear wheel casters H and I which are positioned forward with respect to the direction of travel of the baby carriage are allowed to swivel.

Figure 1:
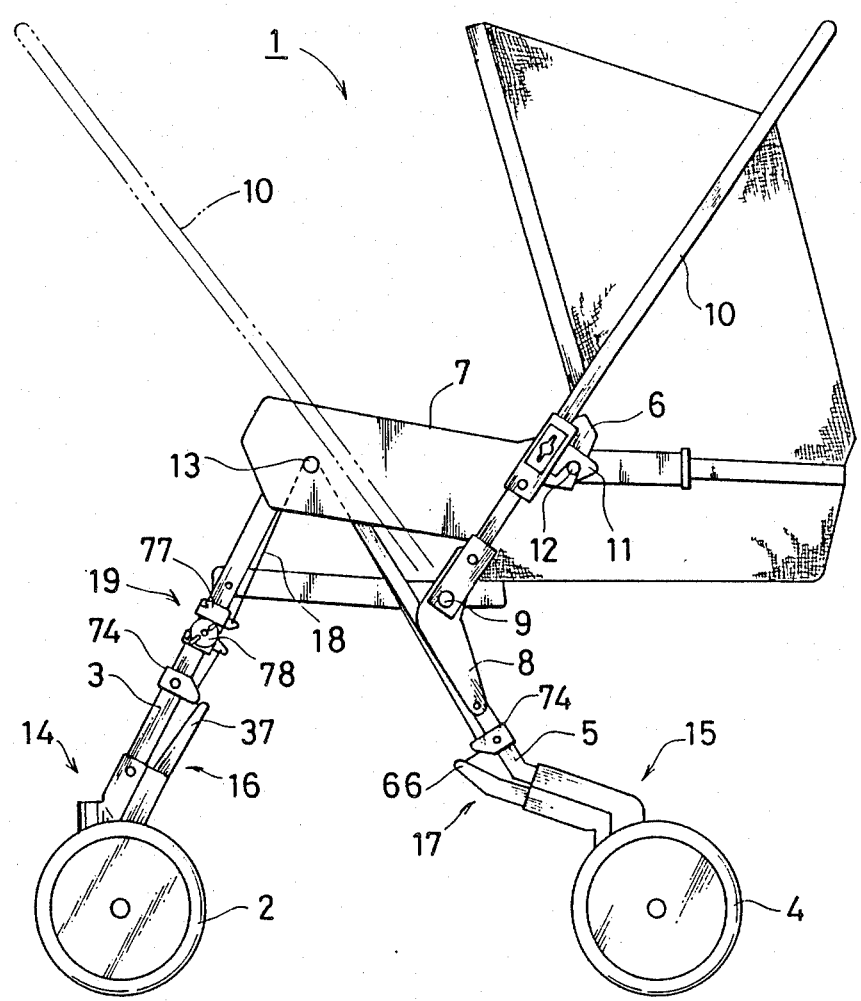
FIG. 1 is a side view showing a first embodiment of the invention.

FIG. 1 is a side view showing a first embodiment of this invention. An outline of this embodiment will now be given using FIG. 1.

A baby carriage 1 shown comprises front legs 3 having front wheels 2 on the lower ends thereof, rear legs 5 having rear wheels 4 on the lower ends thereof, handrails 6, lateral plates 7 attached to said handrails 6, and a push rod 10 rotatably attached by a pin 9 to brackets 8 installed on the rear legs 5. The push rod 10 can be switched between two states, one for the face-to-back push mode and the other for the face-to-face push mode. In FIG. 1, the push rod 10 is in the face-to-back push mode. The push rod 10 has an engaging hook 11 turnably attached thereto. When the push rod 10 is in the face-to-back push mode, the engaging hook 11 engages the engaging pin 12 installed on the handrail 6, thus fixing the position of the push rod. On the other hand, when the push rod 10 is in the face-to-face push mode, the engaging hook 11 engages an engaging pin 13 installed on the lateral plate 7, thus fixing the position of the push rod.

The pair of front wheels 2 and the pair of rear wheels 4 are installed so that they can swivel. That is, the lower ends of the pair of front legs and pair of rear legs have front wheel casters 14 and rear wheels casters 15 attached thereto, respectively. Front wheel caster locking means 16 is associated with the front wheel casters 14. The front wheel caster locking means 16 acts to allow or inhibit the operation of the front wheel casters 14. Likewise, rear wheel caster locking means 17 is associated with the rear wheel casters 15. The rear wheel caster locking means 17 acts to allow or inhibit the operation of the rear wheel casters 15.

The front and rear wheel caster locking means 16 and 17 are connected together by a wire 18. The wire 18 is entrained around an engaging pin 13 extending through the lateral plate 7. Wire position switching means 19 installed on the front leg 3 switches the position of the wire 18 between a front position where it brings said position relatively close to the rear wheel caster 15 and a rear position where it brings said position relatively close to the rear wheel caster 15.

When the push rod 10 is in the face-to-back push mode, the wire position switching means 19 is operated to bring the position of the wire 18 to the rear position, whereupon the front wheel caster locking means 16 allows the swiveling of the front wheel caster 14, while the rear wheel caster locking means 17 inhibits the swiveling of the rear wheel caster 15. Thus, when the baby carriage is moved in the face-to-back push mode, only the front casters 14 positioned forwrd with respect to the direction of travel are allowed to swivel, so that smooth change of direction can be effected.

Suppose that the push rod 10 is switched to the face-to-face push mode shown in phantom lines in FIG. 1. In that case, the wire position switching means 19 is operated to bring the position of the wire to the front position, whereupon the front wheel caster locking means 16 inhibits the swiveling of the front wheel caster 14, while the rear wheel caster locking means 17 allows the swiveling of the rear wheel caster 15. Thus, when the baby carriage is moved in the face-to-face push mode, only the rear casters 15 positioned forward with respect to the direction of travel are allowed to swivel, so that smooth change of direction of travel of the baby carriage 1 can be effected.

In this manner, smooth change of direction can be effected whether the push rod 10 is in the face-to-back push mode or in the face-to-face push mode.

The construction of the front wheel caster 14 will be described with reference to FIGS. 2 through 9.

Figure 2:
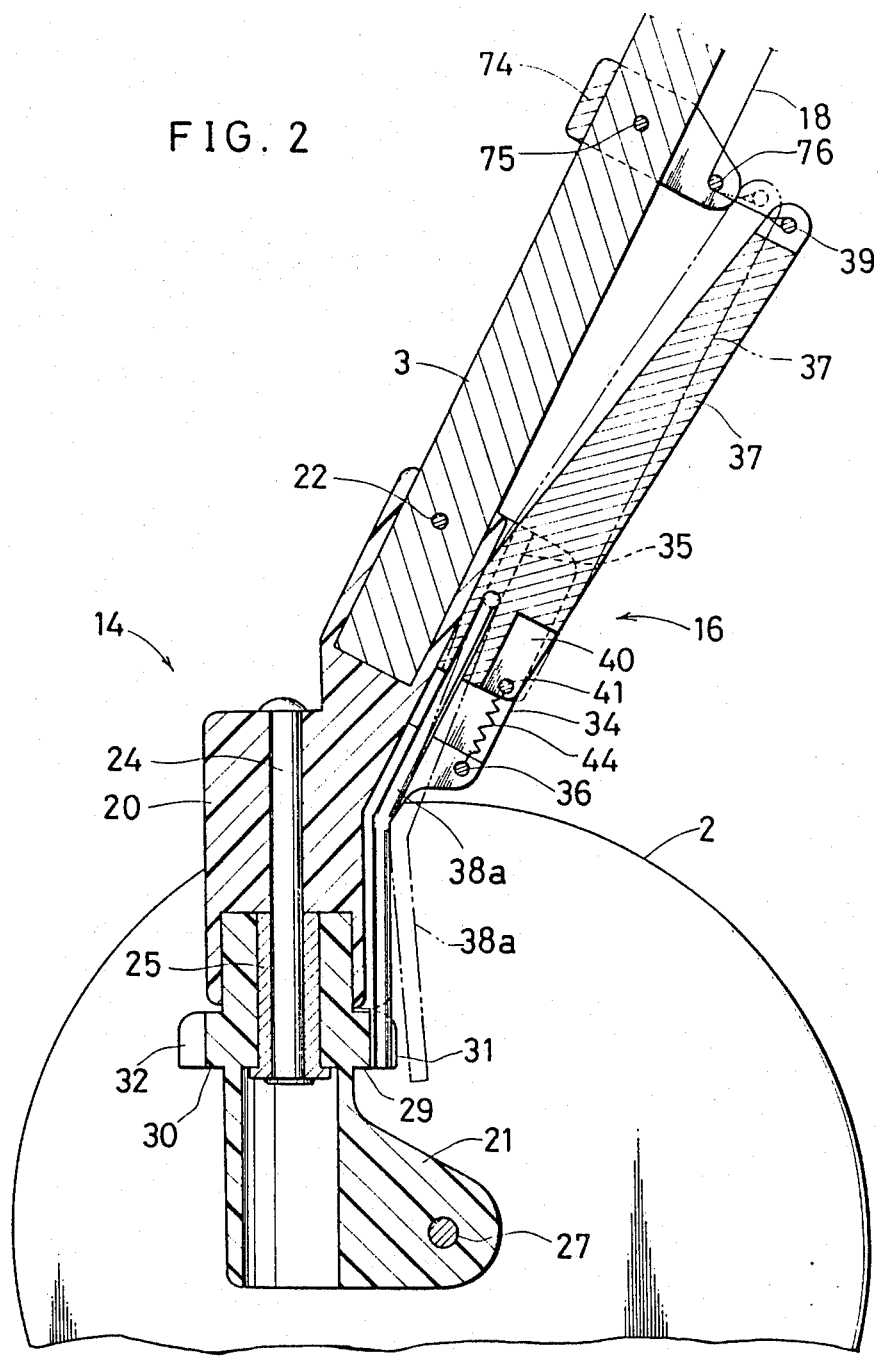
FIG. 2 is a side view, in section, of a portion associated with a front wheel caster 14 shown in FIG. 1.

The front wheel caster 14 has a fixed bracket 20 fixed at its upper end to the front leg 3 by a pin 22, and a rotary yoke 21 rotatably supported by said fixed bracket 20. In FIGS. 3 through 5, the fixed bracket 20 is shown in detail. A through-hole 23 shown in FIGS. 3 and 5 is used to receive that pin 22 shown in FIG. 2. As shown in FIG. 2, the fixed bracket 20 holds a vertically extending support shaft 24.

In FIGS. 6 through 8, the rotary yoke 21 is shown in detail. The rotary yoke 21 is cylindrical in its upper portion, and this cylindrical portion is fitted in a cylindrical opening in the fixed bracket 20. The rotary yoke 21 is formed with a vertically extending central opening 26. A sleeve 25 is fitted in said central opening 26. Referring to FIG. 2, the support shaft 24 extends through the sleeve 25. In this manner, the rotary yoke 21 is supported by the fixed bracket 20 so that it can be rotated around the axis of the support shaft 24. The rotary yoke 21 rotatably supports the front wheel 2 through an axle 27 inserted at a position horizontally deviated from the support shaft 24. A through-hole 28 in FIG. 6 is used to receive the axle 27.

Referring to FIGS. 6 through 8, the rotary yoke 21 is formed with two projections 29 and 30 at positions point-symmetrical with respect to the axis of the support shaft 24 extending through the central opening 26. These projections 29 and 30 are formed with vertically extending engaging recesses 31 and 32, respectively.

Referring to FIGS. 3 through 5, the fixed bracket 20 has a pair of parallel projecting walls 33 and 34 which project rearward. One projecting wall 34 positioned inside is formed with a notch 35 extending downward from the upper end. Further, the lower portions of the projecting walls 33 and 34 are fixedly provided with a shaft 30 interconnecting the projecting walls 33 and 34.

FIGS. 2 through 8 show the construction associated with the left-hand side one of the pair of front wheel casters 14 provided right and left on the baby carriage 1. FIG. 9 shows the front wheel caster 14 positioned on the right-hand side of the baby carriage 1. The front wheel caster positioned on the left-hand side of the baby carriage 1 is basically the same in construction as the front wheel caster 14 positioned on the right-hand side of the baby carriage 1.

The construction of the front wheel caster locking means 16 will now be described with reference to FIGS. 2, 9, and 10 through 17.

First referring to FIG. 2, the front wheel caster locking means 16 has a front rotary arm 37 turnably attached to the fixed bracket 20 of the front wheel caster 14 positioned on the left-hand side of the baby carriage 1, and a front stopper rod 38 fixedly attached to said front rotary arm 37. FIGS. 13 and 14 show the front stopper rod 38 in detail.

Figure 10:
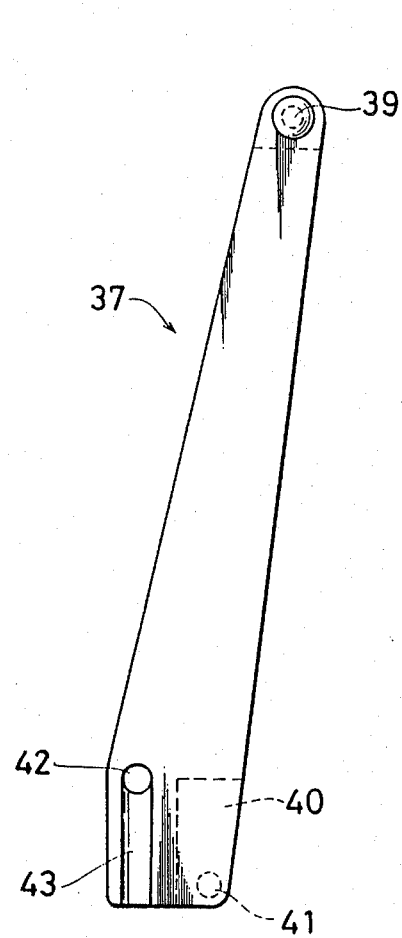
FIG. 10 is a side view of a front rotary arm shown in FIG. 2.
Figure 11:
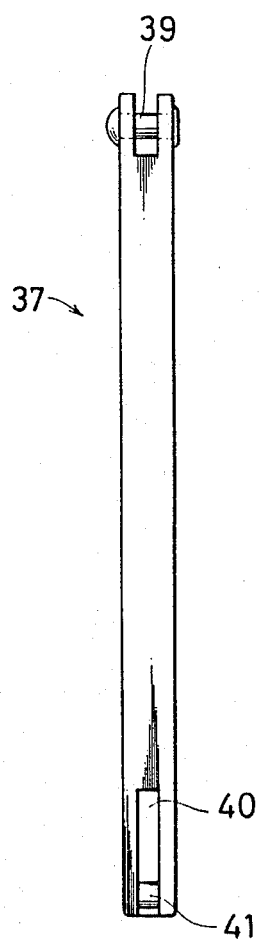
FIG. 11 is a view taken from the right-hand side of the front rotary arm shown in FIG. 10.
Figure 12:
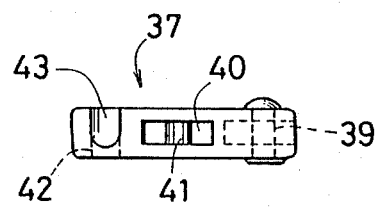
FIG. 12 is a view taken from the bottom side of the front rotary arm shown in FIG. 10.

Referring to FIGS. 10 and 12, the upper portion of the front rotary arm 37 is bifurcated, and a shaft 39 is attached to said bifurcated portion. The lower end portion of the front rotary arm 37 is formed with an opening 40, in which a shaft 41 is installed. The lower end portion of the front rotary arm 37 is also formed with a through-hole 42 and a vertical groove 43. The vertical groove 43 extends to establish the communication between the lower end of the front rotary arm 37 and the through-hole 42. The front rotary arm 37 of such shape is positioned between the projecting walls 33 and 34 projecting rearward from the fixed bracket 20.

Referring to FIGS. 13 and 14, the front stopper rod 38 is of inverted U-shape as a whole, having a pair of downwardly extending leg portions 38a and 38b, and a connecting portion 38c connecting said leg portions. The connecting portion 38c extends to interconnect the pair of front wheel casters 14 positioned right and left on the baby carriage 1. This will be described in more detail with reference to FIGS. 2 and 9. The left-hand end of the connecting portion 38c of the front stopper rod 38 extends through the projecting wall 34 formed on the fixed bracket 20 of the front wheel caster 14 positioned on the left-hand side of the baby carriage, and then through the front rotary arm 37. Referring to FIGS. 5 and 10, as described above, the projecting wall 34 is formed with the notch 35, while the front rotary arm 37 is formed with the through-hole 42. The connecting portion 38c of the front stopper rod 38 extends through said notches 35 and through-hole 42. One leg portion 38a of the front stopper rod 38 fits in the vertical groove 43 of the front rotary arm 37 and its front end portion is capable of fitting in the engaging recess 31 of the rotary yoke 21. Thus, the front rotary arm 37 held between the projecting walls 33 and 34 is capable of turning around the axis of the connecting portion 38c of the front stopper rod 38. Since one leg portion 38c of the front stopper rod 38 fits in the vertical groove 43 of the front rotary arm 37, the turning movement of the front rotary arm 37 results in turning the front stopper rod 38. In FIG. 2, the state of the front rotary arm 37 and front stopper rod 38 turned from the illustrated state is shown in phantom lines.

Referring to FIG. 2, the shaft 41 of the front rotary arm 37 is connected to the shaft 36 of the fixed bracket 20 by a front wheel return spring 44. The front wheel return spring 44 constantly urges the front rotary arm 37 to turn clockwise as viewed in the figure, that is, it urges the leg portion 38a of the front stopper rod 38 to engage the engaging recess 31 of the rotary yoke 21. If the front stopper rod 38 is engaged with the engaging recess 31, the rotary yoke 21 cannot rotate relative to the fixed bracket 20. That is, the swiveling of the front wheel caster 14 is inhibited. On the other hand, if the front rotary arm 37 and front stopper rod 38 are turned against the force of the front wheel return spring 44, as shown in phantom lines in FIG. 2, the engagement between the front stopper rod 38 and the engaging recess 31 is canceled, so that the swiveling of the front caster 14 is allowed. In addition, in the state in which the rotary yoke 21 has turned through 180 degrees from the state shown in FIG. 2, the other engaging recess 32 can be engaged by the front stopper rod 38.

Referring to FIG. 9, the rotary plate 45 is disposed between the projecting walls 33 and 34 of the front wheel caster 14 positioned on the right-hand side of the baby carriage 1. The rotary plate 45 is shown in detail in FIGS. 15 through 17. As shown, the rotary plate 45 has a shaft 46 in the lower end portion thereof. Further, the upper portion of the rotary plate 45 is formed with a through-hole 47 and a vertical groove 48. The vertical groove 48 extends to establish the communication between the lower end of the rotary plate 45 and the through-hole 47.

The right-hand end of the connecting portion 38c of the front stopper rod 38 shown in FIGS. 13 and 14 extends through the projecting wall 34 of the front wheel caster 14 positioned on the right-hand side of the baby carriage 1 and then through the through-hole 47 of the rotary plate 45. Further, the leg portion 38b of the front stopper rod 38 fits in the vertical groove 38d and its front end is capable of fitting in the engaging recess 31 of the rotary yoke 21. In this manner, the rotary plate 45 is capable of turning around the axis of the connecting portion 38c of the front stopper rod 38. Since the leg portion 38d of the front stopper rod 38 fits in the vertical groove 48 of the rotary plate 45, the rotary plate 45 and front stopper rod 38 are turned as a unit. In FIG. 8, the state established by turning the rotary plate 45 and the leg portion 38d of the front stopper rod 38, is shown in phantom lines. Further, as shown, the shaft 46 of the rotary plate 45 is connected to the shaft 36 of the fixed bracket 20 by a spring 49. The spring constantly urges the rotary plate 45 to turn clockwise, that is, it urges the leg portion 38b of the front stopper rod 38 to engage the engaging recess 31 and 32 of the rotary yoke 21.

Since the legs 38a and 38b of the front stopper rod 38 are integrally connected by the connecting portion 38c, as described above, the turning movement of one leg portion 38a caused by turning the front rotary arm 37 results in turning the other leg portion 38b. Therefore, by turning the front rotary arm 37, it is possible to allow or inhibit the swiveling of the pair of front wheel casters 14 positioned right and left.

Figure 18:
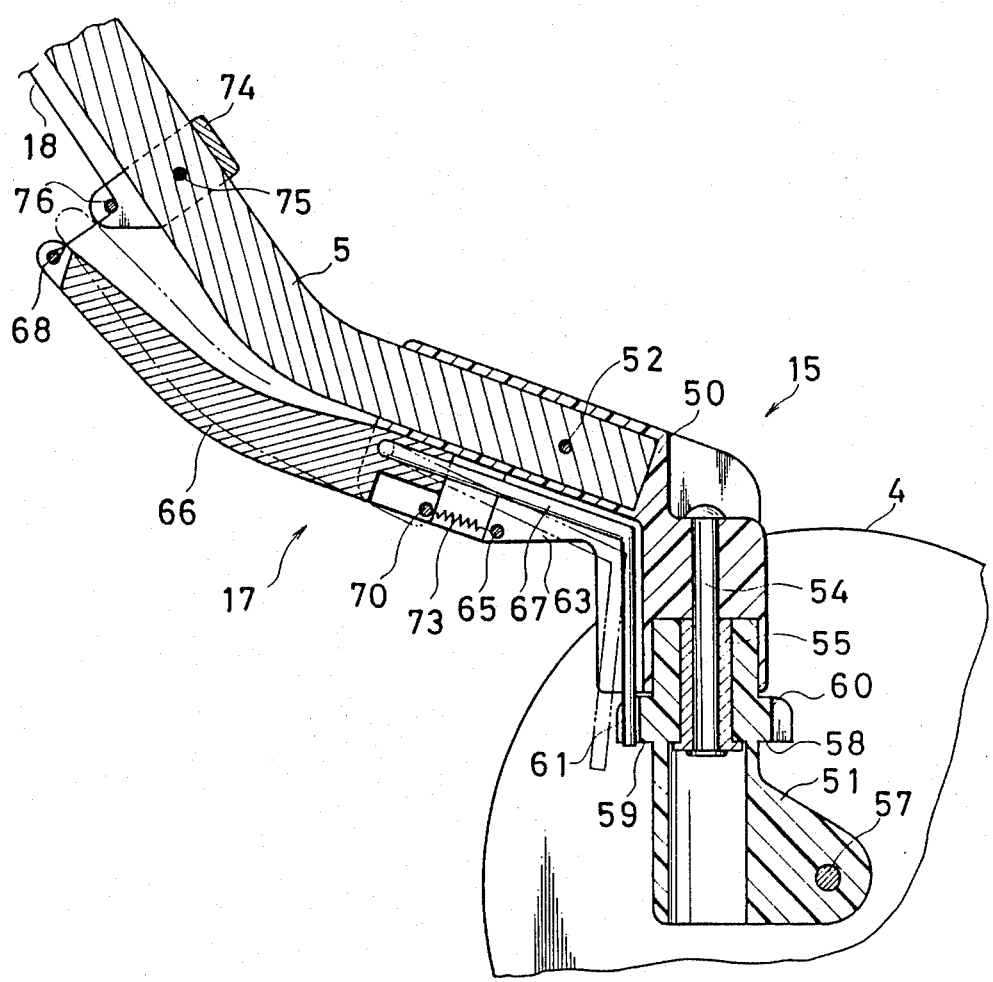
FIG. 18 is a side view, in section, of a portion associated with a rear wheel caster.

Next, referring to FIGS. 18 through 21, the construction of the pair of rear wheel casters 15 positioned right and left on the baby carriage 1 will now be described. In addition, FIGS. 18 through 20 show portions associated with that one of the pair of rear wheel casters 15 which is positioned on the left-hand side of the baby carriage 1; the basic construction is the same for both right and left rear wheel casters.

The rear wheel caster 15 has a fixed bracket 50 fixedly attached to the rear leg 5 by a pin 52, and a rotary yoke 51 rotatably supported by said fixed bracket 50 by a support shaft 54 and a sleeve 55. The rotary yoke 51 rotatably supports the rear wheel 4 through an axle 57 at a position horizontally deviated from the support shaft 54.

The rotary yoke 51, like the rotary yoke 21 shown in FIGS. 6 through 8, has two projections 58 and 59 and engaging recess 60 and 61 formed in said projections.

In FIGS. 19 through 21, the fixed bracket 50 is shown in detail. A through-hole 53 shown in FIGS. 19 and 21 is used to receive a pin 52 shown in FIG. 18. As shown, the fixed bracket 50 has a pair of parallel projecting walls 62 and 63 which project forward. One projecting wall 62 disposed inward is formed with a notch 64. A shaft 65 is fixedly provided between the projecting walls 62 and 63.

The construction of the rear wheel caster locking means 17 will now be described in detail with reference to FIGS. 18 and 22 through 24. The rear wheel caster locking means 17 has a rear rotary arm 66 whose lower end portion is positioned between the projecting walls 62 and 63 of the fixed bracket 50, and a rear stopper rod 67 fixedly attached to the rear rotary arm 66.

FIGS. 22 through 24 show the shape of the rear rotary arm 66 in detail. The upper end portion of the rear rotary arm 66 is provided with a shaft 68, and the lower end portion is formed with an opening 69. A shaft 70 is provided in the opening 69. Further, the lower end portion of the rear rotary arm 66 is formed with a through-hole 71 and a vertical groove 72. The vertical groove 72 extends to establish the communication between the lower end of the rear rotary arm 66 and the through-hole 71.

The rear stopper rod 67 is the same in shape as the front stopper rod 38 shown in FIGS. 13 and 14. Though not shown, the rotary plate 45 which is the same as that shown in FIGS. 15 and 16 is disposed between the pair of projecting walls of the rear wheel caster positioned on the right-hand side of the baby carriage 1. The left-hand end of the connecting portion of the rear stopper rod 67 extends through the notch 64 of the fixed bracket 50 shown in FIG. 21 and then through the through-hole 71 of the rear rotary arm 66.

The left-hand side leg portion of the rear stopper rod 67 fits in the vertical groove 72 of the rear rotary arm 66 and its front end is capable of fitting in the engaging recess 61 of the rotary yoke 51. Likewise, the right-hand end of the connecting portion of the rear stopper rod 67 is inserted through the projecting wall of the right-hand side fixed bracket, and then through the rotary plate. The other leg portion of the rear stopper rod 67 fits in the vertical groove of the rotary plate, and its front end is capable of fitting in the engaging recess of the right-hand side rotary yoke.

In this manner, the rear rotary arm 66 and rear stopper rod 67 are capable of turning around the axis of the connecting portion of the rear stopper rod 67. In FIG. 18, the state obtained by turning the rear rotary arm 66 and rear stopper rod 67, is shown in phantom lines. Further, as shown in FIG. 18, the shaft 70 of the rear rotary arm 66 is connected to the shaft 65 of the fixed bracket 50 by a rear wheel return spring 73. The rear wheel return spring 73 urges the rear rotary arm 66 and rear stopper rod 67 to turn counterclockwise as viewed in the figure, that is, it urges the rear stopper rod 67 to engage the engaging recess 61 or 60 of the rotary yoke 51.

Figure 25:
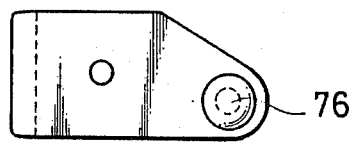
FIG. 25 is a side view of a wire guide member 74 shown in FIGS. 2 and 18.
Figure 26:
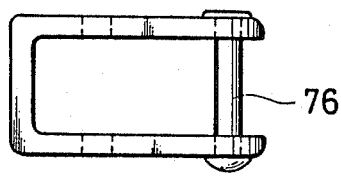
FIG. 26 is a plan view of the wire guide member shown in FIG. 25.

Referring to FIG. 2, a wire guide member 74 shown in FIGS. 25 and 26 is fixedly attached by a pin 75 to the front leg 3 adjacent the upper end of the front rotary arm 37. The wire guide member 74 has a pair of parallel walls which are connected by a shaft 76. Likewise, referring to FIG. 18, such wire guide member 74 is also fixedly attached by a pin 75 to the rear leg 5 adjacent the upper end of the rear rotary arm 66. The front end of the wire 18 shown in FIG. 1 is entrained around the shaft 76 of the wire guide member 74 attached to the front leg 3 and is connected to the shaft 39 of the front rotary arm 37. On the other hand, the rear end of the wire 18 is entrained around the shaft 76 of the wire guide member 74 attached to the rear leg 5 and is connected to the shaft 76 of the rear rotary arm 66. In this manner, the upper end of the front rotary arm 37 is connected to the upper end of the rear rotary arm 66 by the wire 18.

Referring mainly to FIGS. 1 and 27 through 33, the construction of the wire position switching means 19 will now be described. The wire position switching means 19 switches the position of the wire 18 between the front position in which it brings said position relatively close to the front wheel caster 14 and the rear position in which it brings said position relatively close to the rear wheel caster 15. In this embodiment, the wire position switching means 19 is positioned somewhere in the path of the wire 18.

Figure 28:
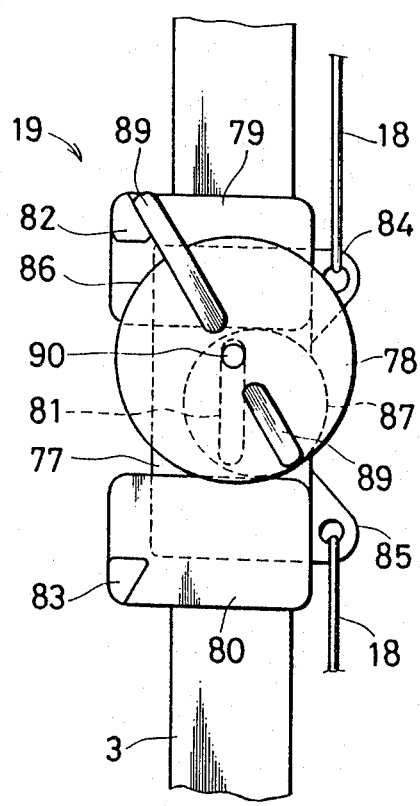
FIG. 28 is a view showing the state of an operating knob turned from the state shown in FIG. 27.
Figure 27:
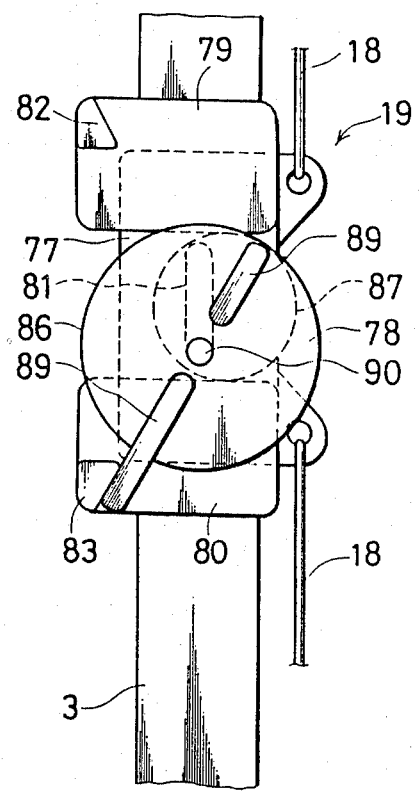
FIG. 27 is an enlarged side view of wire position switching means 19 shown in FIG. 1.

FIGS. 27 and 28 show an enlarged view of the wire position switching means 19. The wire position switching means 19 comprises a slide sleeve 77 shown in FIGS. 29 through 31 and an operating knob 78 shown in FIGS. 32 and 33.

Figure 29:
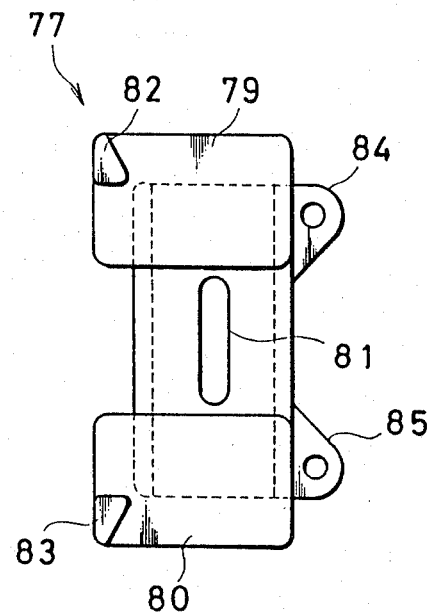
FIG. 29 is a side view of a slide sleeve which is a component of the wire position switching means.
Figure 30:
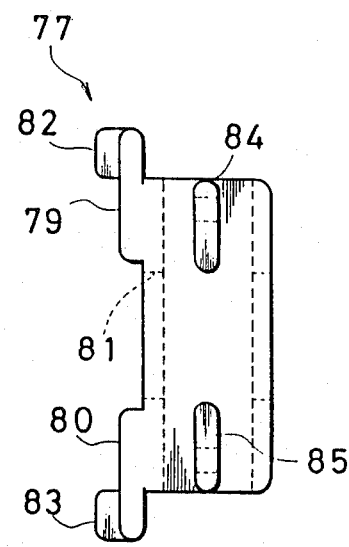
FIG. 30 is a view taken from the right-hand side of the slide sleeve shown in FIG. 29.
Figure 31:
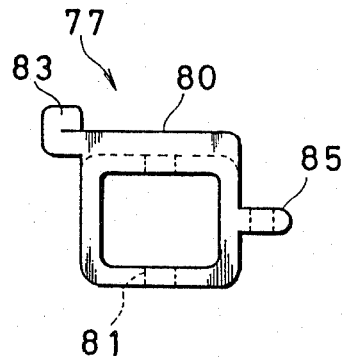
FIG. 31 is a view taken from the bottom side of the slide sleeve shown in FIG. 29.

Referring to FIGS. 29 through 31, the slide sleeve 77 is configured to surround the front leg 3 and to be capable of vertically sliding on the front leg 3. As shown, the slide sleeve 77 has two vertically spaced flat plate-like projections 79 and 80. Vertically extending elongated openings 81 are formed between said two flat plate-like projections 79 and 80. The slide sleeve 77 has two lugs 84 and 85 to connect the wire somewhere in its path.

Figure 32:
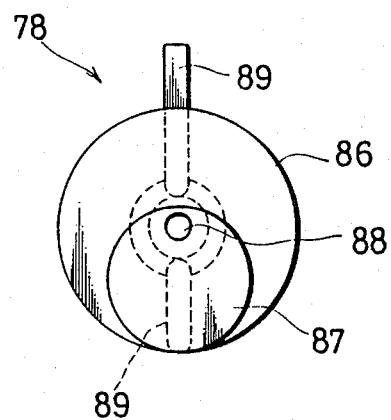
FIG. 32 is a view showing an operating knob which is a component of the wire position switching means.
Figure 33:
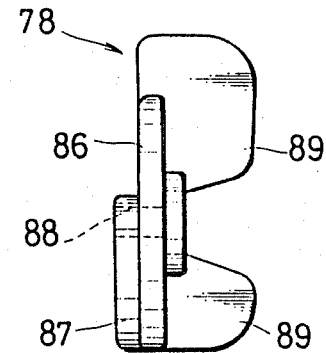
FIG. 33 is a view taken from the right-hand side of the operating knob shown in FIG. 32.

Referring to FIGS. 32 and 33, the operating knob 78 comprises a large disk 86 with its center at a central hole 88 extending therethrough, a small disk 87 disposed at an eccentric position with respect to the central hole 88, and a grip 89 (shown divided in two) projecting from the large disk 86. The diameter of the small disk 87 is substantially equal to the distance between the two flat plate-like projections 79 and 80 on the slide sleeve 77 shown in FIG. 29.

Referring to FIGS. 27 and 28, the operating knob 78 is placed on the slide sleeve 77. In this state, the small disk 87 of the operating knob 78 is positioned between the two flat plate-like projections 79 and 80 on the slide sleeve 77 while the large disk 86 overlaps the flat plate-like projections 79 and 80, and the operating knob 78 is turnably connected to the front leg 3 by a pin 90 extending through the central hole 88. In addition, the pin 90 extends through the elongated openings 81. Therefore, if the user, holding the grip 89 of the operating knob, turns the operating knob 78, the small disk 87 acts as a cam, vertically sliding the slide sleeve 77.

In the state shown in FIG. 27, the grip 89 of the operating knob 78 abuts against an abutment 83 formed on the flat plate-like projection 80, inhibiting the operating knob 78 from further turning clockwise. And the slide sleeve 77 is positioned relatively upward. In addition, the wire 18 is tensioned by the front wheel return spring 44 shown in FIG. 2 and the rear wheel return spring 73 shown in FIG. 18. Therefore, when the slide sleeve 77 assumes the relatively upper position, the wire 18 is brought to the rear position in which it is relatively close to the rear wheel caster 15.

On the other hand, if the operating knob 78 is turned counterclockwise until the grip 89 abuts against the abutment 89, the slide sleeve 77 is positioned relatively downward, as shown in FIG. 28. In the state shown in FIG. 28, the wire 18 has been brought relatively close to the front wheel caster 14.

In this manner, by turning the operating knob 78 of the wire position switching means 19, it is possible to switch the position of the wire 18 between the front position in which it brings said position relatively close to the front wheel caster 14 and the rear position in which it brings said position relatively close to the rear wheel caster 15.

The overall operation of this embodiment of the invention will now be described. Suppose that the push rod 10 is in the face-to-back push mode. In this case, the operating knob 78 is brought to the state shown in FIG. 27. In this state, the wire 18 has been brought to the rear position in which it is relatively close to the rear wheel caster 15. Therefore, the front rotary arm 37 is pulled by the wire 18 to turn counterclockwise, as shown in phantom lines in FIG. 2. In response to this, the front stopper rod 38 is also turned counterclockwise, as shown in phantom lines, disengaged from the engaging recess 31 of the rotary yoke 21. Thus, the rotary yoke 21 can rotate relative to the fixed bracket 20, allowing the swiveling of the front wheel caster 14. In addition, the front wheel caster 14 on the right-hand side shown in FIG. 9 is allowed to swivel, in the same manner as in the left-hand side front wheel caster.

On the other hand, referring to FIG. 18, if the wire 18 is in the rear position in which it is relatively close to the rear wheel caster 15, the rear rotary arm 66 is held in the solid line position by the action of the rear wheel return spring 73. In this state, the rear stopper rod 67 is engaged with the engaging recess 61 of the rotary yoke 51. Therefore, the rotary yoke 51 cannot rotate relative to the fixed bracket 50, so that the swiveling of the rear wheel caster 15 is inhibited.

Thus, when the push rod 10 is in the face-to-back push mode shown in solid lines in FIG. 1, the front wheel caster 14 alone is allowed to swivel, while the swiveling of the rear wheel caster 15 is inhibited. Thus, when the baby carriage 1 is moved, its direction of travel can be easily changed.

When the push rod 10 is switched to the face-to-face push mode shown in phantom lines in FIG. 1, the operating knob 78 must be brought to the state shown in FIG. 28. In this state, the wire 18 has been brought to the front position in which it is relatively close to the front wheel caster 14. Therefore, referring to FIG. 2, the front rotary arm 37 is turned clockwise by the action of the front wheel return spring 44. In response to this turning of the front rotary arm 37, the front stopper rod 38 is also turned, fitting in the engaging recess 31 or 32 of the rotary yoke 21. Therefore, the rotation of the rotary yoke 21 is inhibited and so is the swiveling of the front wheel caster 14. On the other hand, referring to FIG. 18, the rear rotary arm 66 is pulled by the wire 18 to be turned to the phantom line position. In response to this turning of the rear rotary arm 65, the rear stopper rod 67 is also turned, disengaged from the engaging recess 61. Therefore, the rotary yoke 51 is allowed to rotate relative to the fixed bracket 50, thus allowing the swiveling of the rear wheel caster 15.

Thus, even when the push rod 10 is in the face-to-face push mode shown in phantom lines in FIG. 1, only the rear wheel casters which are now positioned forward with respect to the direction of travel are allowed to swivel, so that when the baby carriage 1 is moved, its direction of change can be easily effected.

Figure 34:
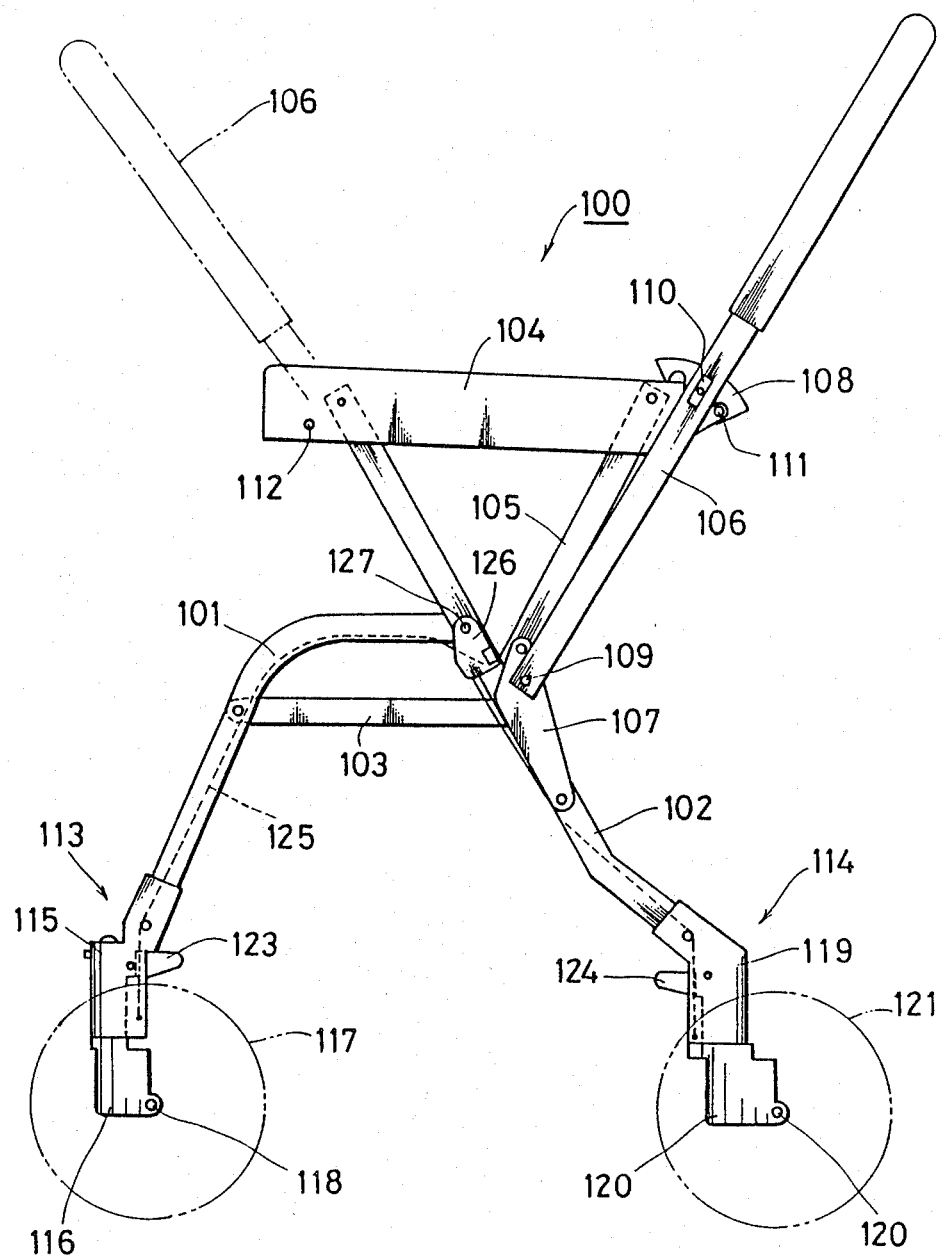
FIG. 34 is a left-hand side view showing a second embodiment of the invention.

FIG. 34 is a side view showing a second embodiment of the invention. The second embodiment of the invention will now be described with reference to this figure. In addition, in FIG. 34, only the left-hand side of the baby carriage is shown. A view looking at the right-hand side will be the same except for a wire 125 and a displacing member 126 to be later described; thus, only the arrangement associated with the right-hand side will be described.

The illustrated baby carriage 100 has a basic skeleton arrangement including a front leg 101, a rear leg 102, a seat support rod 103 for supporting the seat, a handrail 104, a handrail support rod 105, and a push rod 106. The lower end of the push rod 106 is turnably connected by a shaft 109 to a reverse-turn bracket 107 which reversely turns when the baby carriage is folded.

The push rod 106 has hook 108 positioned on its inner side and a knob 110 positioned on its outer side. The hook 108 and knob 110 operate in a unit. Thus, if the knob 110 is operated for a turning movement, the hook 108 is turned. In the illustrated state, the hook 108 is engaged with an engagement pin 111 installed in the rear region of the handrail 104, thereby maintaining the push rod 106 in the face-to-back push mode. When the push rod 106 is brought to the face-to-face push mode as shown in phantom lines in FIG. 34, the hook 108 engages an engagement pin 112 installed on the front region of the handrail 104.

The front leg 101 has a front wheel caster 113 attached to the lower end thereof. The front wheel caster 113 comprises a fixed bracket 115 fixedly attached to the front leg 101, and a rotary yoke 116 rotatably supported on the fixed bracket 115. The front wheel 117 is rotatably supported by the rotary yoke 116 through an axle 118.

A rear wheel caster 114 is attached to the lower end of the rear leg 102. The rear wheel caster 114 comprises a fixed bracket 119 fixedly attached to the rear leg 102, and a rotary yoke 120 rotatably supported on the fixed bracket 119. The rear wheel 121 is rotatably supported by the rotary yoke 120 through an axle 112.

Installed in the fixed bracket 115 of the front wheel caster 113 is a front slider 123 adapted to slide vertically. In the illustrated state, the front slider 123 is positioned in the upper position. When the front slider 123 is so positioned in the upper position, the rotary yoke 116 is allowed to rotate. On the other hand, when the front slider 123 is positioned in the lower position, it engages the rotary yoke 116, resulting in inhibiting the rotation of the rotary yoke 116.

Installed in the fixed bracket 119 of the rear wheel caster 114 is a rear slider 124 adapted to move vertically. In the illustrated state, the rear slider 124 is positioned in the lower position. When the rear slider 124 is so positioned in the lower position, it is engaged with the rotary yoke 120, thereby inhibiting the rotation of the rotary yoke 120.

The front and rear sliders 123 and 124 are interconnected by a wire 125. A displacing member 126 is placed somewhere between the ends of the wire 125 and connected thereto. The displacing member 126 is disposed in the region of the rear leg 102 within the range of the turning movement of the push rod 106 and is turnably connected to the rear leg 102 by a pin 127.

In the state shown in FIG. 34, the push rod 106 is positioned in the face-to-back push mode. And the front wheel caster 113 positioned forward with respect to the direction of travel of the baby carriage is inhibited from swiveling. Next, suppose that the push rod 106 is operated for a turning movement and thereby switched to the face-to-face push mode as shown in phantom lines. Thereupon, the displacing member 126 is pushed by the push rod 106 and thereby turned, bringing the wire 125 to the front position where the wire is positioned close to the front wheel caster 113. As a result, the front slider 123 is moved downward and engages the rotary yoke 116 to inhibit the rotation of the latter. On the other hand, the rear slider 124 is moved upward and cancels its engagement with the rear slider 120 to allow the rotation of the latter. In this way, when the baby carriage 100 is moved in the face-to-face push mode, the rear wheel caster 114 positioned forward with respect to the direction of travel of the baby carriage is allowed to swivel, while the front wheel caster 113 positioned rearward with respect to the direction of travel of the baby carriage is inhibited from swiveling.

Figure 35:
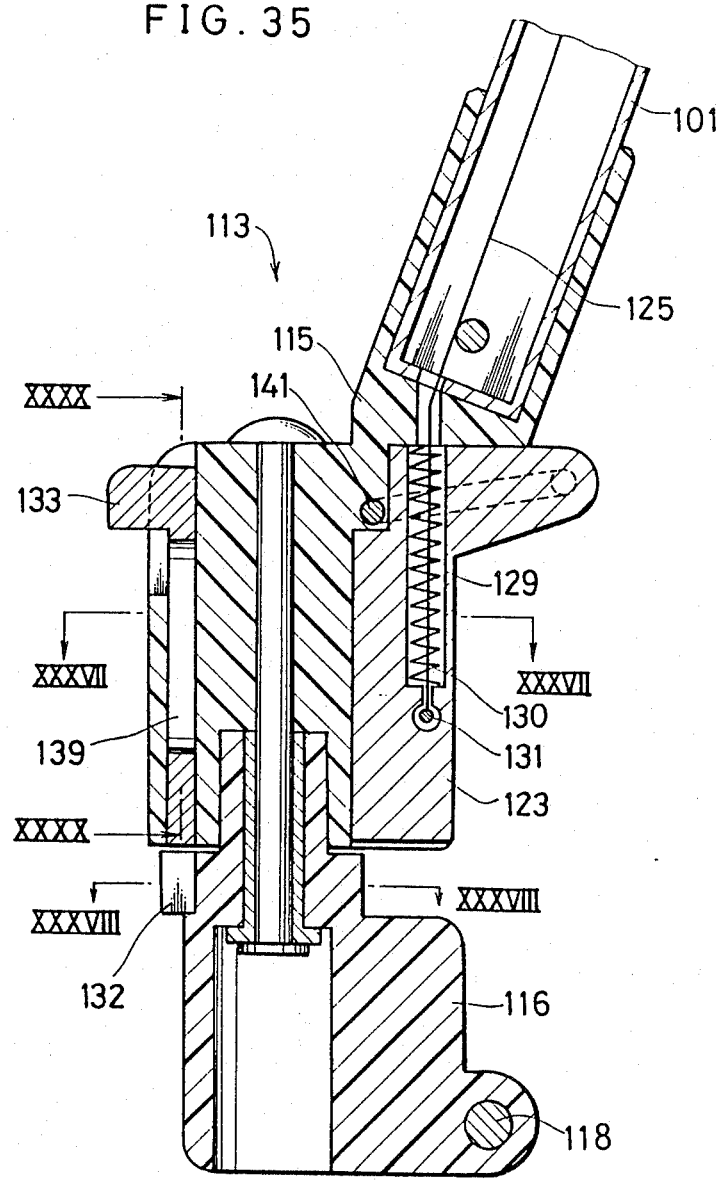
FIG. 35 is a side view, in section, of a front wheel caster 113 shown in FIG. 34.

In FIG. 35, a sectional view of the front wheel caster 113 is shown. The front wheel caster 113 comprises a fixed bracket 115 fixedly attached to the front leg 101, and a rotary yoke 116 rotatably supported on the fixed bracket 115.

Referring to FIG. 37 which is an end view taken along the line XXXVII—XXXVII in FIG. 35, the fixed bracket 115 has a front slider 123 installed therein. The fixed bracket 115 is formed with a vertically extending groove 128. The front slider 123 is shaped to fit in this groove 128 and adapted to slide vertically therein. Further, the front slider 123 is formed with a vertical hole 129 for receiving a return spring 130. The return spring 130 urges the front slider 123 to move downward. One end of a wire 125 extending from the rear wheel caster 114 is connected to the front slider 123 by an attachment pin 131.

Referring to FIG. 38 which is a side view taken along the line XXXVIII—XXXVIII in FIG. 35, the upper portion of the rotary yoke 116 is formed with an engagement groove 132. The engagement groove 132 is shaped to receive the lower end portion of said front slider 123. In the state shown in FIG. 35, the front slider 123 is held in the upper position, and the engagement groove 132 of the rotary yoke 116 is positioned opposite the front slider 123. When the rotary yoke 116 is rotated through 180° from this state and when the front slider 123 is moved downward, the front slider 123 engages the engagement groove 132, whereby the rotation of the rotary yoke 116 is inhibited.

Referring to FIG. 40 which is an end view taken along the line XXXX—XXXX in FIG. 35, the fixed bracket 115 has a manual caster locking member 133 installed therein. This manual caster locking member 133 is received in an upwardly extending opening 134 formed in the fixed bracket 115 and is adapted to slide vertically therein. To hold the manual caster locking member 133 fixed in a predetermined position, the manual caster locking member 133 is formed with two sets of engagement projections 137 and 138, while the fixed bracket 115 is formed with two sets of engagement grooves 135 and 136. In the state shown in FIGS. 35 and 40, one set of engagement projections 137 are engaged with one set of engagement grooves 135, while the other set of engagement projections 138 are engaged with the other set of engagement grooves 136, whereby the manual caster locking member 133 is fixed. If the manual caster locking member 133 is moved downward from this state by hand or by foot, two sets of engagement projections 137 and 138 both engage the engagement grooves 136 located below, thereby locking the manual caster locking member 133 in that position. When the engagement projections 137 are disengaged from the engagement grooves 135, the manual caster locking member 133 will be inwardly flexed. To facilitate this flection, the manual caster locking member 133 is formed with an elongated opening 139.

In the state shown in FIG. 35, the manual caster locking member 133 is in the upper position. If the manual caster locking member 133 is moved to the lower position from this state by hand or by foot, the lower end portion of the manual caster locking member 133 engages the engagement groove 132 of the rotary yoke 116. As a result, the rotation of the rotary yoke is inhibited.

It is arranged that when the baby carriage 100 is being moved in the face-to-back push mode, as shown in FIG. 34, only the front wheel caster 113 is allowed to swivel. During normal travel, since the front wheel caster 113 is allowed to swivel, the change of direction of travel can be easily made. However, when the baby carriage is moved on a bad road, such as one having a greatly uneven surface, the front wheel caster 113, if allowed to swivel, would react to the unevenness of the road surface so excessively as to make it more difficult to operate the baby carriage. In such case, the swiveling of the front wheel caster 113 can be inhibited by moving the manual caster locking member 113 downward by hand or by foot.

The front wheel caster 113 shown in FIG. 35 is positioned on the left-hand side of the baby carriage 100. The front wheel caster which is positioned on the right-hand side of the baby carriage 100 has the same construction as the one shown in FIG. 35 except for the portion associated with the wire 125. Thus, the front wheel caster positioned on the right-hand side of the baby carriage has a front slider which is vertically slidable. This pair of front sliders 123 are interconnected by a connecting rod 141 so that they make the same movement.

In FIG. 39, there is a plan view of the front slider 123. Referring to FIG. 39 as well as FIG. 35, the front slider 123 is formed with an inward projection 140 extending inwardly of the baby carriage. Further, the fixed bracket 115 has the end portion of a front connecting rod 141 rotatably inserted therein. The front connecting rod 141 is bent at right angles just after it has come out of the fixed bracket 115, and then it is received in the inward projection 140 on the front slider 123. The front connecting rod 141 is then bent at right angles within the inward projection 140 and extends along the inward projection inwardly of the baby carriage. The front connecting rod 141 extends to the right-hand side of the baby carriage, where it is received in the inward projection on the front slider of the right-hand side front wheel caster and is rotatably supported by the fixed bracket. Referring to FIG. 35, when the front slider 123 is moved downward by the movement of the wire 125, the front connecting rod 141 is turned clockwise around the axis of the end portion thereof inserted in the fixed bracket 115. As a result, the front slider 123 of the right-hand side front wheel caster is also moved downward. In this way, the pair of front sliders 123 disposed on the right and left sides are caused to make the same movement by the front connecting rod 141 interposed therebetween.

Figure 36:
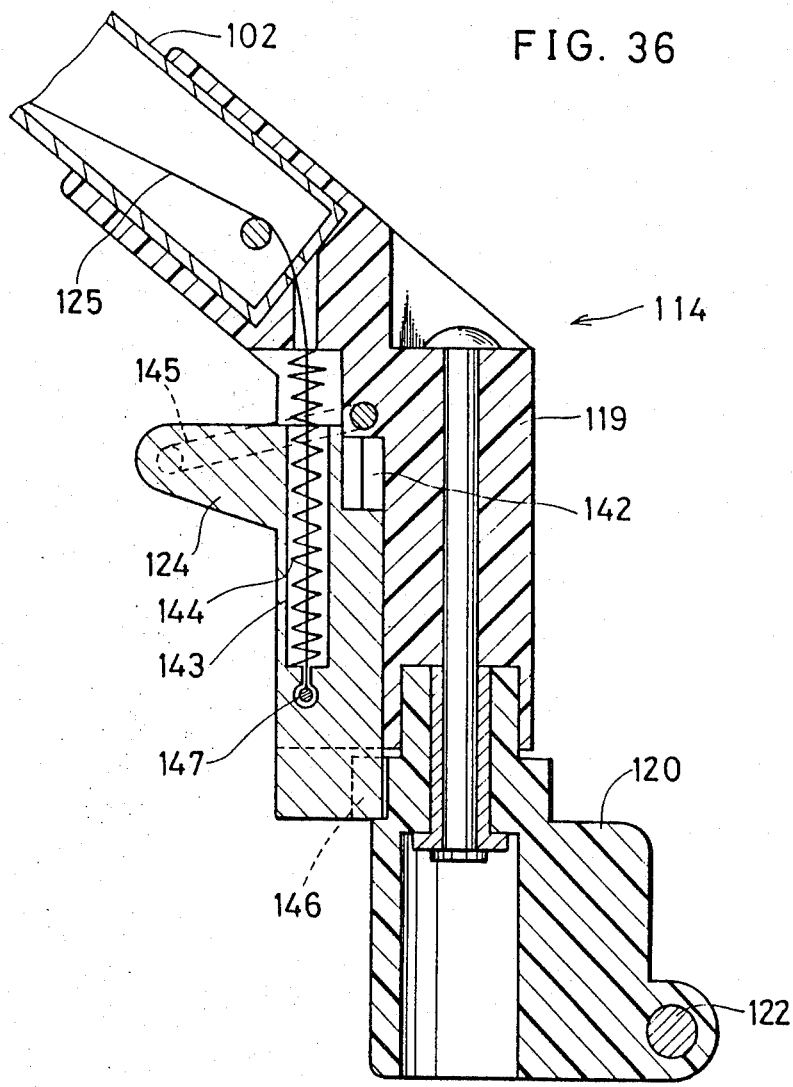
FIG. 36 is a side view, in section, of a rear wheel caster 114 shown in FIG. 34.

FIG. 36 shows a sectional view of the rear wheel caster 114. The rear wheel caster 114 comprises a fixed bracket 119 fixedly attached to the rear leg 102, and a rotary yoke 120 rotatably supported by said fixed bracket 119.

The fixed bracket 119 is formed with a vertically extending guide groove 142, in which a rear slider 124 is received. The rear slider 124 is adapted to slide vertically along the guide groove 142. In the state shown in FIG. 36, the rear slider 124 has been moved to the lower position. As a result, the lower end portion of the rear slider 124 engages the engagement groove 146, thereby inhibiting the rotation of the rotary yoke 120. If the rear slider 124 is moved upward from this state, the engagement between the lower end portion of the rear slider 124 and the engagement groove 146 of the rotary yoke 120 is canceled, whereby the rotary yoke 120 is allowed to rotate.

The rear slider 124 is formed with a vertically extending groove 143, in which a return spring 144 is received. The return spring 144 is urged to move downward at all times.

The other end of the wire 125 extending from the front wheel caster is connected to the rear slider 124 by an attachment pin 147. Therefore, if the wire 125 is moved from the illustrated state toward the front wheel caster, the rear slider 124 is moved upward against the force of the return spring 144.

FIG. 36 shows the left-hand side rear wheel caster 114 positioned on the left-hand side of the baby carriage. The right-hand side rear wheel caster positioned on the right-hand side of the baby carriage is the same in construction as the left-hand side rear wheel caster 114 except for the portion associated with the wire 125. The pair of rear sliders 124 positioned on the right and left sides of the baby carriage are interconnected by a rear connecting rod 145. Like the front connecting rod 141 shown in FIG. 35, the rear connecting rod 145 is rotatably supported at its opposite ends in the fixed brackets disposed on opposite sides. Therefore, if the rear slider 124 of the left-hand side rear wheel caster 114 is vertically moved, the rear slider of the right-hand side rear wheel caster is also vertically moved.

Figure 41:
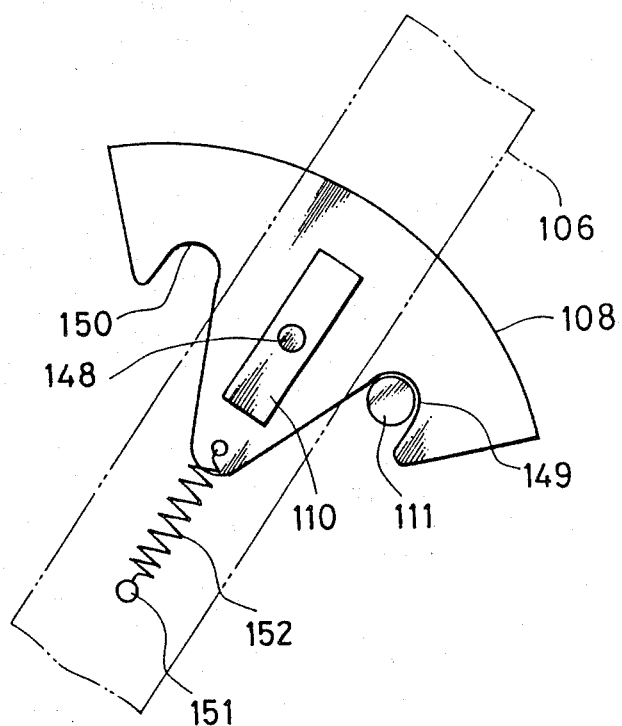
FIG. 41 is a view showing a portion associated with a hook 108 attached to a push rod 106.

FIG. 41 shows the construction of a portion associated with the hook 108 for fixing the push rod 106 in the face-to-back and face-to-face push modes. In this figure, the push rod 106 is shown in phantom lines for the sake of convenience of description.

The hook 108 is mounted on the inner surface of the push rod 106 directed inwardly of the baby carriage, and the knob 110 is mounted on the outer surface thereof. The knob 110 and the hook 108 are joined together so that when the knob 110 is turned, the hook 108 is also turned. As shown, the hook 108 is formed with two engagement recesses 149 and 150. One engagement recess 149 is adapted to engage the engagement pin 111 erected on the rear region of the handrail 104, and the other engagement recess 150 is adapted to engage the engagement pin 112 erected on the front region of the handrail 104.

A pin 151 iserected on the inner surface of the push rod 106 and below the hook 108. The pin 151 is connected to the lower portion of the hook 108 by a return spring 152. The return spring 152 urges the hook 108 to return to the state shown in FIG. 41. In the state shown in FIG. 41, the engagement recess 149 engages the engagement pin 111, whereby the push rod 106 is fixed in the face-to-back push mode. This fixed state is firmly maintained by the action of the return spring 152. When it is desired to change the push rod 106 to the face-to-face push mode, the operator turns the knob 110 counterclockwise against the force of the return spring 152 so as to cancel the engagement between the engagement recess 149 and the engagement pin 111.

Figure 42:
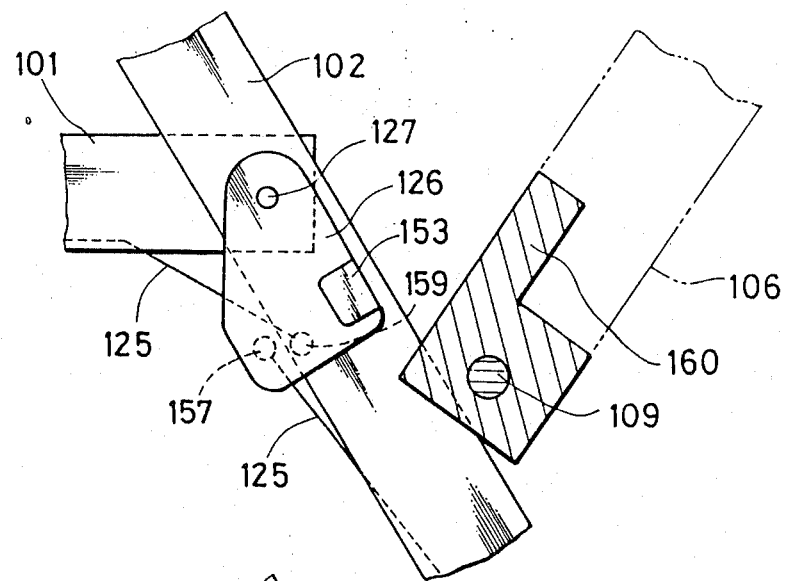
FIGS. 42 and 43 are views showing a portion associated with a displacing member 126 acting as wire position switching means, FIG. 42 showing the push rod 106 fixed in the face-to-back push mode, FIG. 43 showing the push rod fixed in the face-to-face push mode.
Figure 43:
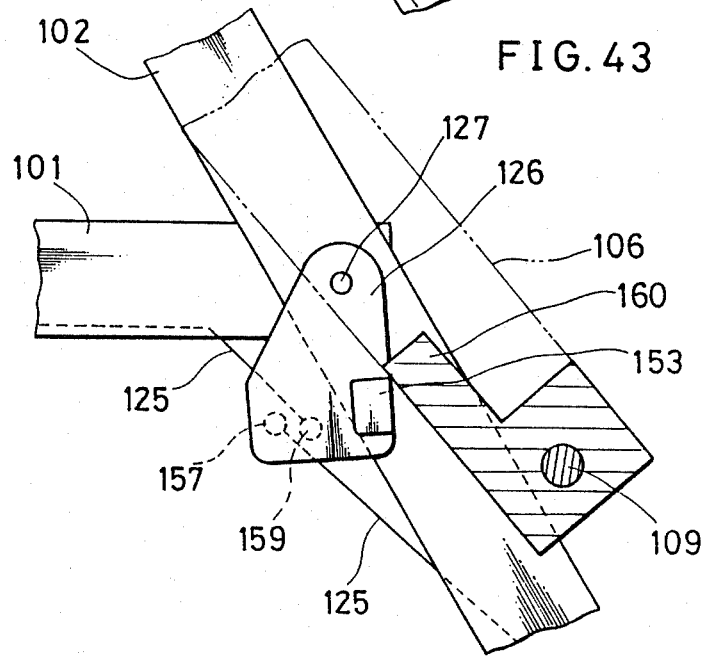

FIGS. 42 and 43 show the construction of a portion associated with the displacing member 126 acting as wire position switching means. In these figures, the portions having nothing to do with the description are omitted. In FIG. 42, the push rod 106 is fixed in the face-to-back push mode, and in FIG. 43 it is fixed in the face-to-face push mode. Further, in FIGS. 44 and 45, the displacing member 126 is shown.

Figure 45:
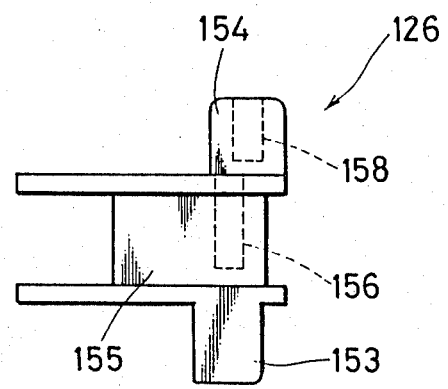
FIG. 45 is a plan view of the displacing member 126.
Figure 44:
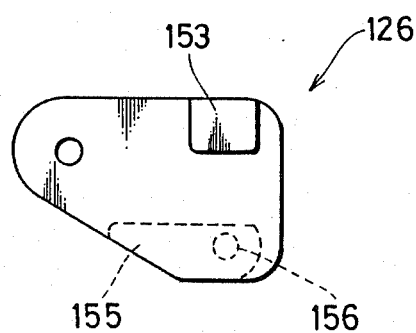
FIG. 44 is a front view of the displacing member 126.

The displacing member 126 is turnably connected to the rear leg 102 by a pin 127. As shown in FIGS. 44 and 45, the displacing member 126 comprises an outward projection 153 exposed toward the outside, i.e., toward the surface of the paper, an inward projection 14 projecting inward, and a bottom wall portion 155 formed at the bottom. The bottom wall portion 155 is formed with a round hole 156. The end of the wire 125 extending from the rear slider 124 has the attachment pin 157 attached thereto, said attachment pin being fitted in the round hole 156 of the displacing member 126. Further, a round hole 158 is formed in the inward projection 154. The end of the wire 125 extending from the front slider 123 has the attachment pin 159 attached thereto, said attachment pin being received in the round hole 158 of the inward projection 154. Thus, it follows that the displacing member 126 is connected somewhere between the ends of the wire 125 connecting the front and rear wheel casters 113 and 125.

The force of the return spring 144 (FIG. 36) urging the rear slider 124 to move downward is greater than the force of the return spring 130 (FIG. 35) urging the front slider 123 to move downward. The difference between the forces of the return springs 144 and 130 applies a force to the displacing member 126, which force tends to turn it counterclockwise. This counterclockwise turning movement is limited by the bottom wall portion 155 of the displacing member 126 abutting against the rear leg 102.

The inner surface of the push rod 106 is provided with a pressing projection 160. When the push rod 106 is fixed in the face-to-back push mode as shown in FIG. 42, the pressing projection 160 is spaced apart from the displacing member 126. In this state, the wire 125 has been brought to the rear position where it is relatively close to the rear wheel caster 114. When the push rod 106 is turned to the face-to-back push mode shown in FIG. 43, the pressing projection 160 on the push rod 106 presses the outward projection 153 on the displacing member 126, thereby turning the displacing member 126 clockwise as viewed in the figure. This clockwise turning movement of the displacing member 126 brings the wire 125 to the front position where it is close to the front wheel caster 113.

As is clear from the above description, in the second embodiment of the invention, the displacing member 126 acting as wire switching means is operated for turning by the push rod 106. Therefore, a desired state can be attained without having to operate the displacing member 126 by hand. That is, when the push rod 106 remains fixed in the face-to-face push mode, the wire 125 has been brought to the rear position. Therefore, in that state, the front wheel caster 113 positioned forward with respect to the direction of travel of the baby carriage is allowed to swivel, but the rear wheel caster 114 positioned rearward with respect to the direction of travel of the baby carriage is inhibited from swiveling.

Next, when the push rod 106 is fixed in the face-to-face push mode, the displacing member 126 is pressed by the pressing projection 160 to bring the wire 125 to the front position. As a result, the rear slider 124 is moved upward, thereby allowing the swiveling of the rear wheel caster 114. On the other hand, the front slider 123 is moved downward to engage the rotary yoke 116, thereby inhibiting the swiveling of the front wheel caster 113. That is, when the push rod 106 is in the face-to-face push mode, the rear wheel caster 114 positioned forward with respect to the direction of travel of the baby carriage is allowed to swivel, while the front wheel caster 113 positioned rearward with respect to the direction of travel of the baby carriage is inhibited from swiveling.

In addition, in this second embodiment, the front wheel caster 113 has a manual caster locking member 133, while the rear wheel caster 114 has no such manual caster locking member. However, the rear wheel caster 114 may be provided with a manual caster locking member.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage including a push rod (10) adapted to be switched between two states, one for the face-to-back push mode and the other for the face-to-face push mode, and front wheel casters (14) on the lower ends of a pair of front legs (3) and rear wheel casters (15) on the lower ends of a pair of rear legs (5), the pair of front wheel casters (14) and the pair of rear wheel casters (15) respectively having fixed brackets (20, 50) attached to the front and rear legs (3, 5), and rotary yokes (21, 51) rotatably supported by said fixed brackets (20, 50) and rotatably supporting wheels, said baby carriage comprising:

front wheel caster locking means (16) movable between first and second positions and adapted, when in said first position, to engage the rotary yoke (21) of the front wheel caster (14) to inhibit the rotation of said rotary yoke (21), rear wheel caster locking means (17) movable between first and second positions and adapted, when in said first position, to engage the rotary yoke (51) of the rear wheel caster (15) to inhibit the rotation of said rotary yoke (51), a front wheel return spring (44) urging the front wheel caster locking means (16) to return to the first position, a rear wheel return spring (73) urging the rear wheel caster locking means (17) to return to the first position, a wire (18) connected at one end thereof to the front wheel caster locking means (16) and at the other end to the rear wheel caster locking means (17), and wire position switching means (19) for switching the position of said wire (18) between a front position in which it is relatively close to the front wheel caster (14) and a rear position in which it is relatively close to the rear wheel caster (15), the arrangement being such that:

when said wire (18) is in the front position, the front wheel caster locking means (16) is in the first position and engages the rotary yoke (21) of the front wheel caster (14) and, on the other hand, the rear wheel caster locking means (17) is in the second position and allows the rotation of the rotary yoke (51) of the rear wheel caster (15), and when said wire (18) is in the rear position, the front wheel caster locking means (16) is in the second position and allows the rotation of the rotary yoke (21) of the front wheel caster (14) and, on the other hand, the rear wheel caster locking means (17) is in the first position and engages the rotary yoke (51) of the rear wheel caster (15).

2. A baby carriage as set forth in claim 1, wherein said front wheel caster locking means (16) comprises:

a front rotary arm (37) turnably attached to said fixed bracket (20) associated with at least one of said pair of front wheel casters (14), and a front stopper rod (38) fixedly attached to said front rotary arm (37) for turning together with the latter and engageable at its opposite ends with the rotary yokes (21) of said pair of front wheel casters (14), one end of said wire (18) being connected to the upper portion of said front rotary arm (37).

3. A baby carriage as set forth in claim 1, wherein said rear wheel caster locking means (17) comprises:

a rear rotary arm (66) turnably attached to said fixed bracket (50) associated with at least one of said pair of rear wheel casters (15), and a rear stopper rod (67) fixedly attached to said rear rotary arm (66) for turning together with the latter and engageable at its opposite ends with the rotary yokes (51) of said pair of rear wheel casters (15), the other end of said wire (18) being connected to the upper portion of said rear rotary arm (66).

4. A baby carriage as set forth in claim 2, wherein said front wheel return spring (44) is installed so that it connects the lower portion of said front rotary arm (37) to said fixed bracket (20).

5. A baby carriage as set forth in claim 3, wherein said rear wheel return spring (73) is installed so that it connects the lower portion of said rear rotary arm (66) to said fixed bracket (50).

6. A baby carriage as set forth in claim 1, wherein said wire position switching means (19) is installed so that it is somewhere in the path of said wire (18).

7. A baby carriage as set forth in claim 6, wherein said wire position switching means (19) comprises:

a slide sleeve (77) installed on at least one of said pair of front legs (3) for slide movement thereon and connected to said wire (18), and an operating knob (78) for slidably operating said slide sleeve (77).

8. A baby carriage as set forth in claim 1, wherein said front wheel caster locking means comprises:

a pair of front sliders (123) respectively held by the fixed brackets of said pair of front wheel casters so that they are vertically slidable, a front connecting rod (141) interconnecting said pair of front sliders so that the front sliders make the same movement, one end of said wire (125) being connected to one of said pair of sliders, the lower end portions of said pair of front sliders being adapted to engage the rotary yokes of said pair of front wheel casters.

9. A baby carriage as set forth in claim 1, wherein said rear wheel caster locking means comprises:

a pair of rear sliders (124) respectively held by the fixed brackets of said pair of rear wheel casters so that they are vertically slidable, a rear connecting rod (141) interconnecting said pair of front sliders so that the rear sliders make the same movement, the other end of said wire (125) being connected to one of said pair of rear sliders, the lower end portions of said pair of rear sliders being adapted to engage the rotary yokes of said pair of rear wheel casters.

10. A baby carriage as set forth in claim 8, wherein front wheel-associated return springs (130) constantly urge said front sliders to move downward.

11. A baby carriage as set forth in claim 9, wherein rear wheel-associated return springs (144) constantly urge said rear sliders to move downward.

12. A baby carriage as set forth in claim 1, wherein said wire position switching means includes a displacing member (126) attached to the baby carriage body and within the range of turning movement of said push rod so that said displacing member is movable between front and rear positions, said displacing member being connected somewhere between the ends of said wire (125), the position of said displacing member being changed by turning said push rod, the arrangement being such that when said push rod is in the face-to-back push mode, said displacing member is in said rear position, while when said displacing member is in the face-to-face push mode, said displacing member is in said front position.

* * * * *